(12) United States Patent
Misaki

(10) Patent No.: US 9,134,867 B2
(45) Date of Patent: Sep. 15, 2015

(54) TOUCH PANEL, DISPLAY DEVICE INCLUDING THE TOUCH PANEL, AND METHOD OF MANUFACTURING THE TOUCH PANEL

(75) Inventor: Katsunori Misaki, Yonago (JP)

(73) Assignee: Sharp Kabushiki Kaisha, Osaka (JP)

( * ) Notice: Subject to any disclaimer, the term of this patent is extended or adjusted under 35 U.S.C. 154(b) by 120 days.

(21) Appl. No.: 13/991,682

(22) PCT Filed: Dec. 2, 2011

(86) PCT No.: PCT/JP2011/006774
§ 371 (c)(1),
(2), (4) Date: Jun. 5, 2013

(87) PCT Pub. No.: WO2012/077321
PCT Pub. Date: Jun. 14, 2012

(65) Prior Publication Data
US 2013/0249863 A1    Sep. 26, 2013

(30) Foreign Application Priority Data
Dec. 9, 2010   (JP) .................. 2010-274982

(51) Int. Cl.
*G06F 3/044* (2006.01)
(52) U.S. Cl.
CPC ...... *G06F 3/044* (2013.01); *G06F 2203/04103* (2013.01); *G06F 2203/04111* (2013.01)

(58) Field of Classification Search
CPC .......... G06F 3/044; G06F 3/041; G06F 3/045
USPC .......................................... 345/174
See application file for complete search history.

(56) References Cited

U.S. PATENT DOCUMENTS

| | | | |
|---|---|---|---|
| 2010/0283762 A1* | 11/2010 | Takusa | 345/174 |
| 2010/0309166 A1* | 12/2010 | Mayumi | 345/174 |
| 2011/0134075 A1* | 6/2011 | Takusa | 345/174 |

FOREIGN PATENT DOCUMENTS

JP    2010-257442 A    11/2010

OTHER PUBLICATIONS

Official Communication issued in International Patent Application No. PCT/JP2011/006774, mailed on Mar. 6, 2012.

* cited by examiner

*Primary Examiner* — Fred Tzeng
(74) *Attorney, Agent, or Firm* — Keating & Bennett, LLP

(57) ABSTRACT

An internal connecting terminal (33) includes a first interconnect layer (34A) formed of a same film as a first conductive pattern for touch position detection under an interlayer insulating film (23), and a second interconnect layer (34B) formed of a same film as a second conductive pattern for touch position detection on the interlayer insulating film (23). The first and the second interconnect layers are electrically connected to a lead line (31) at a portion overlapping the lead line (31), and electrically connected together at a portion outside the lead line (31).

10 Claims, 30 Drawing Sheets

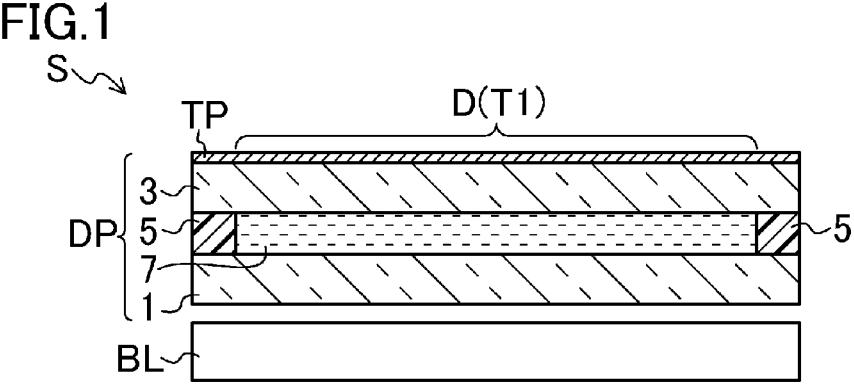
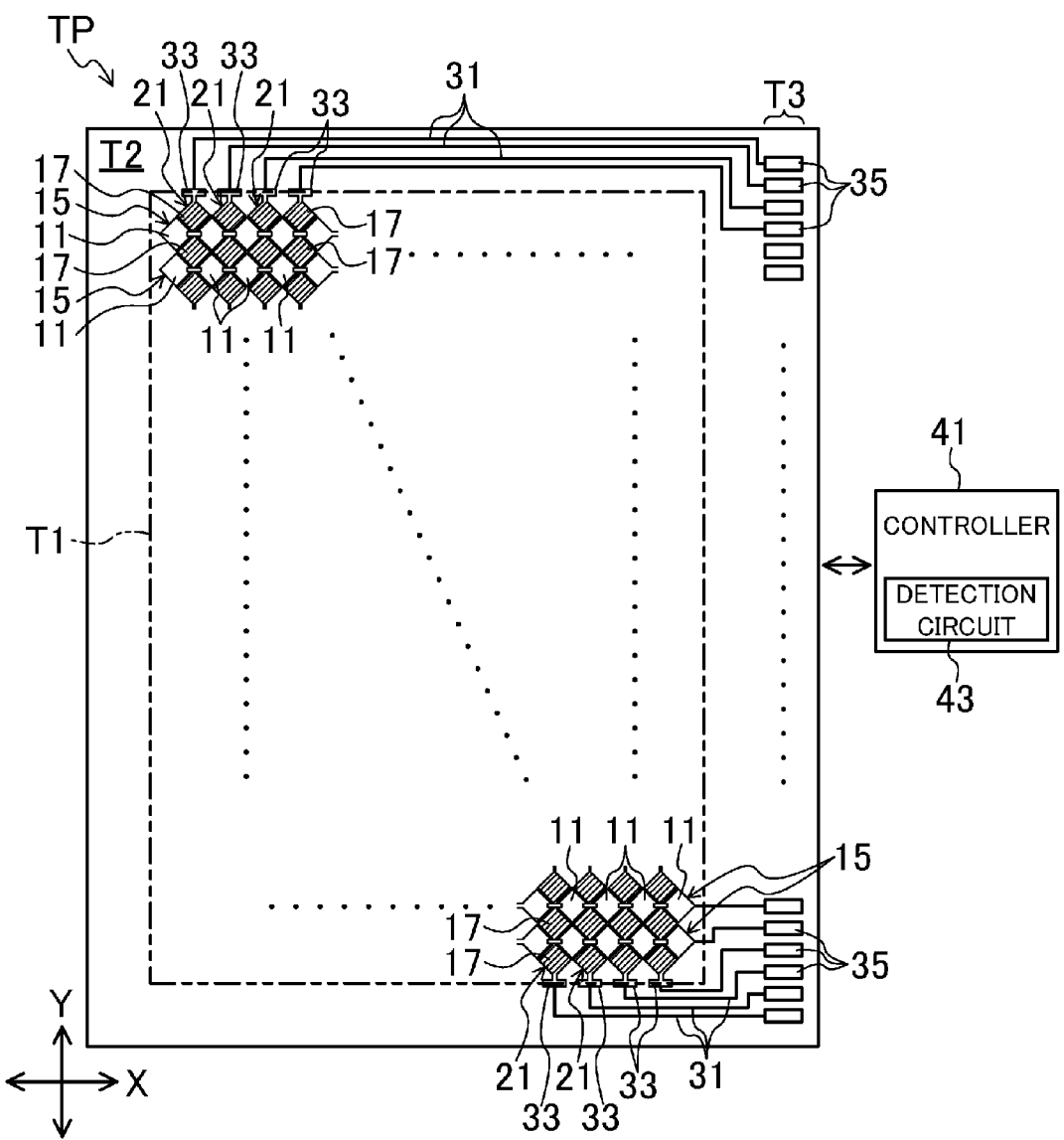

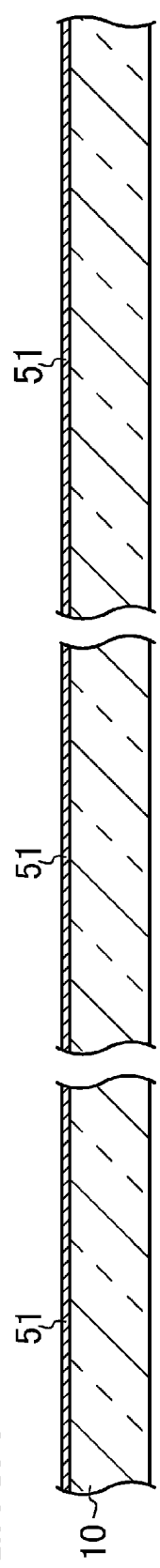
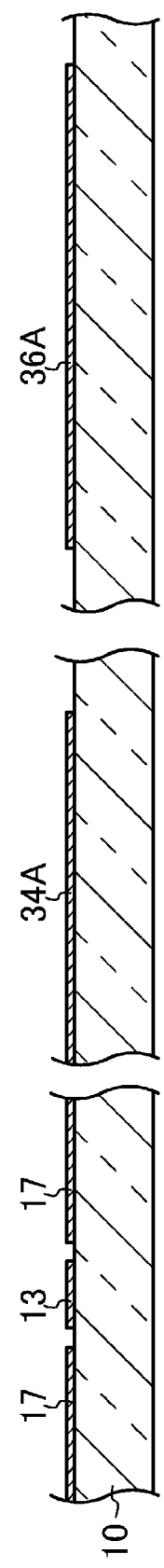

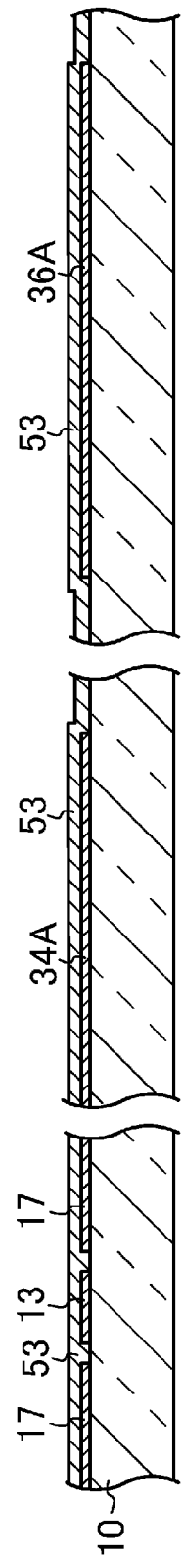
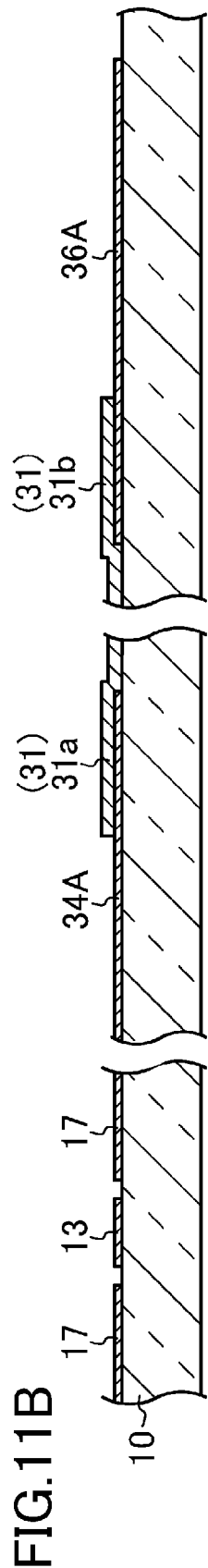
FIG.11A
FIG.11B

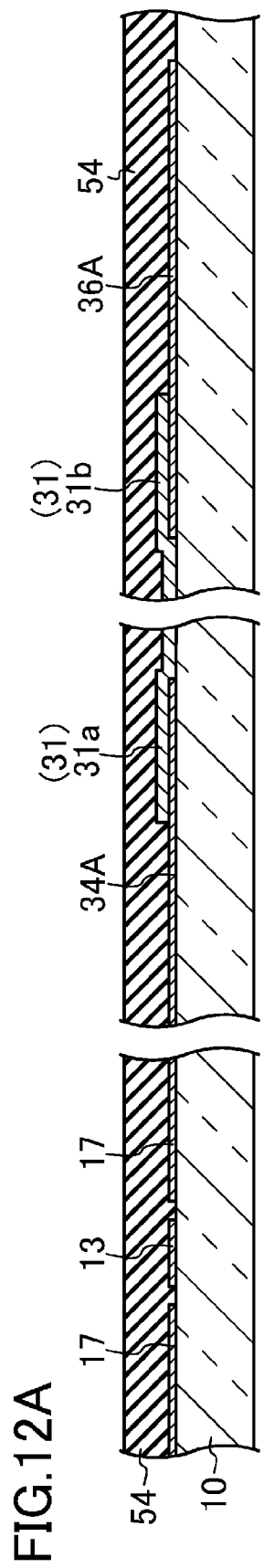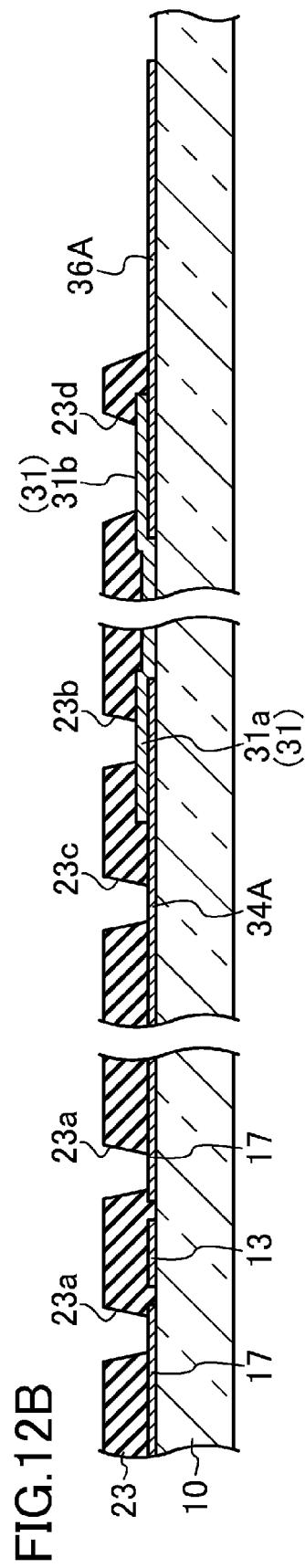

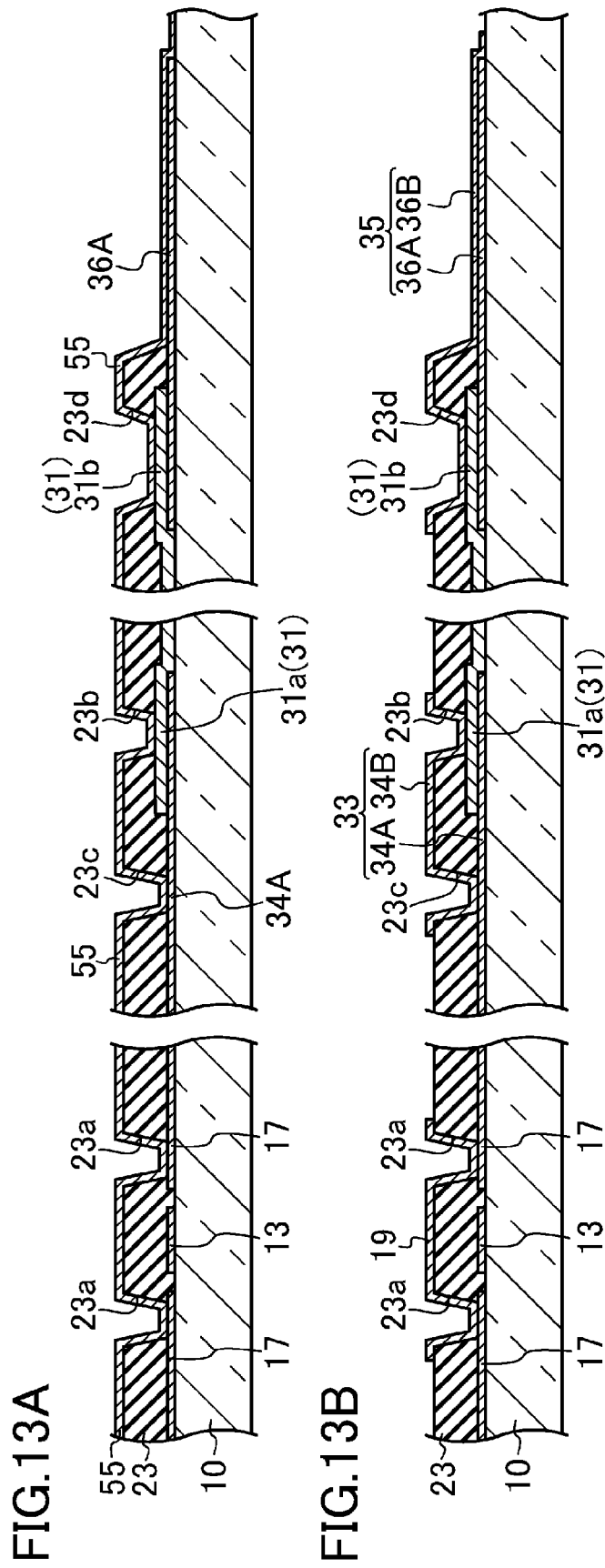

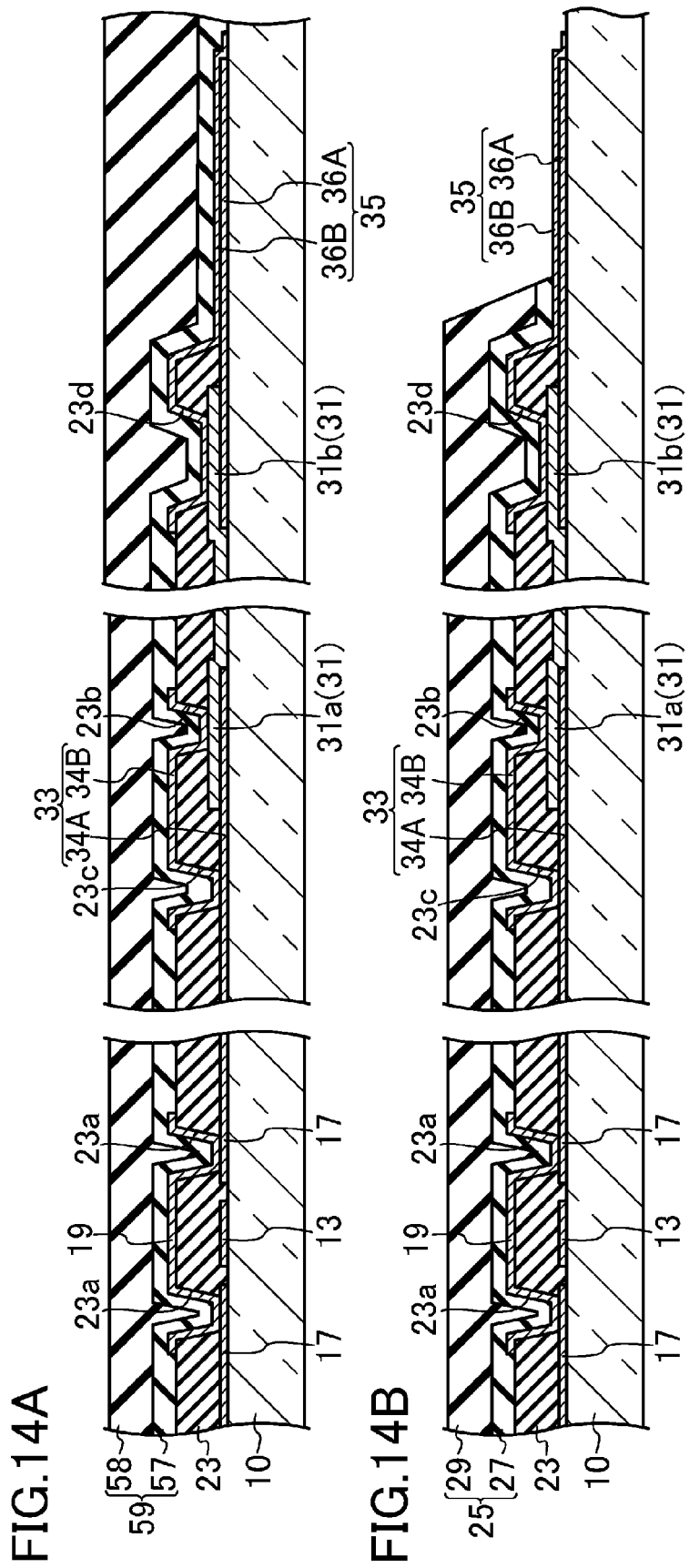

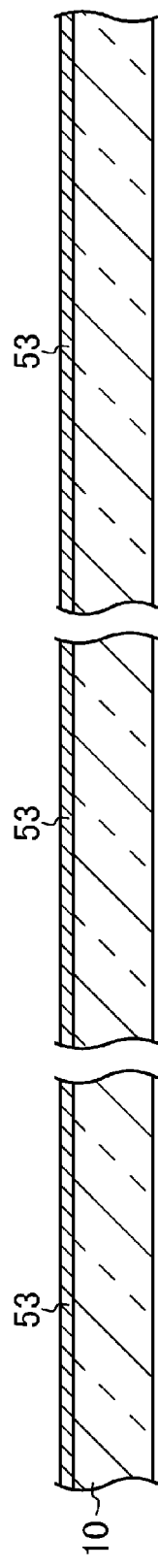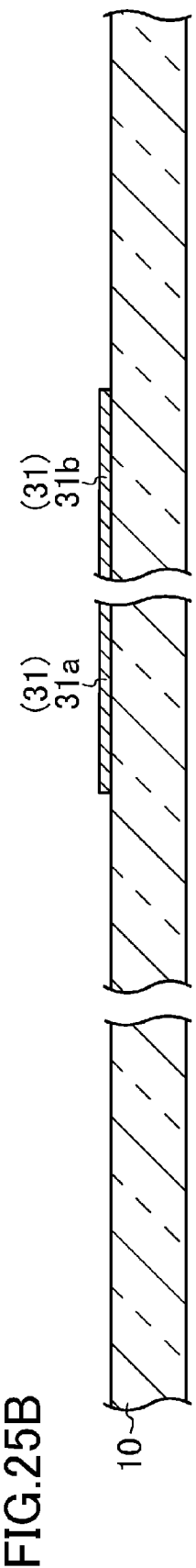
FIG.25A
FIG.25B

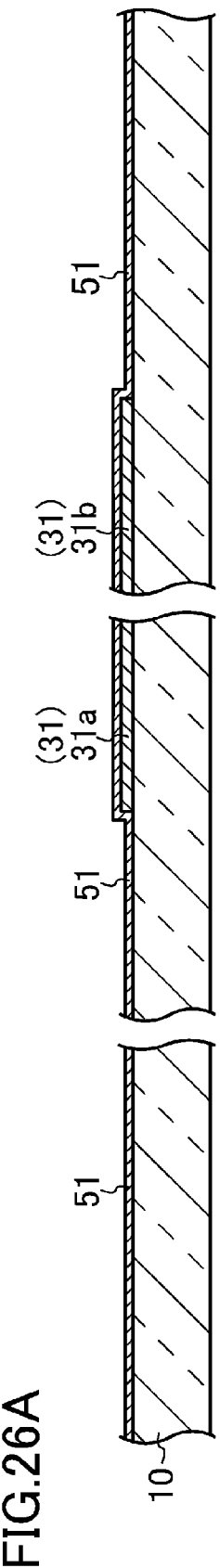
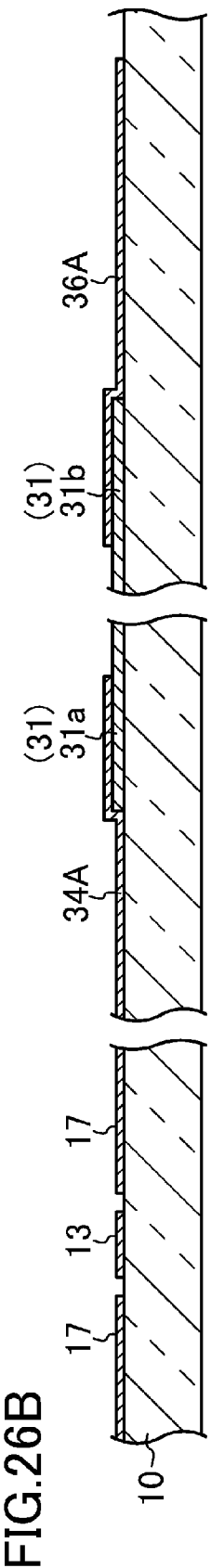
FIG.26A
FIG.26B

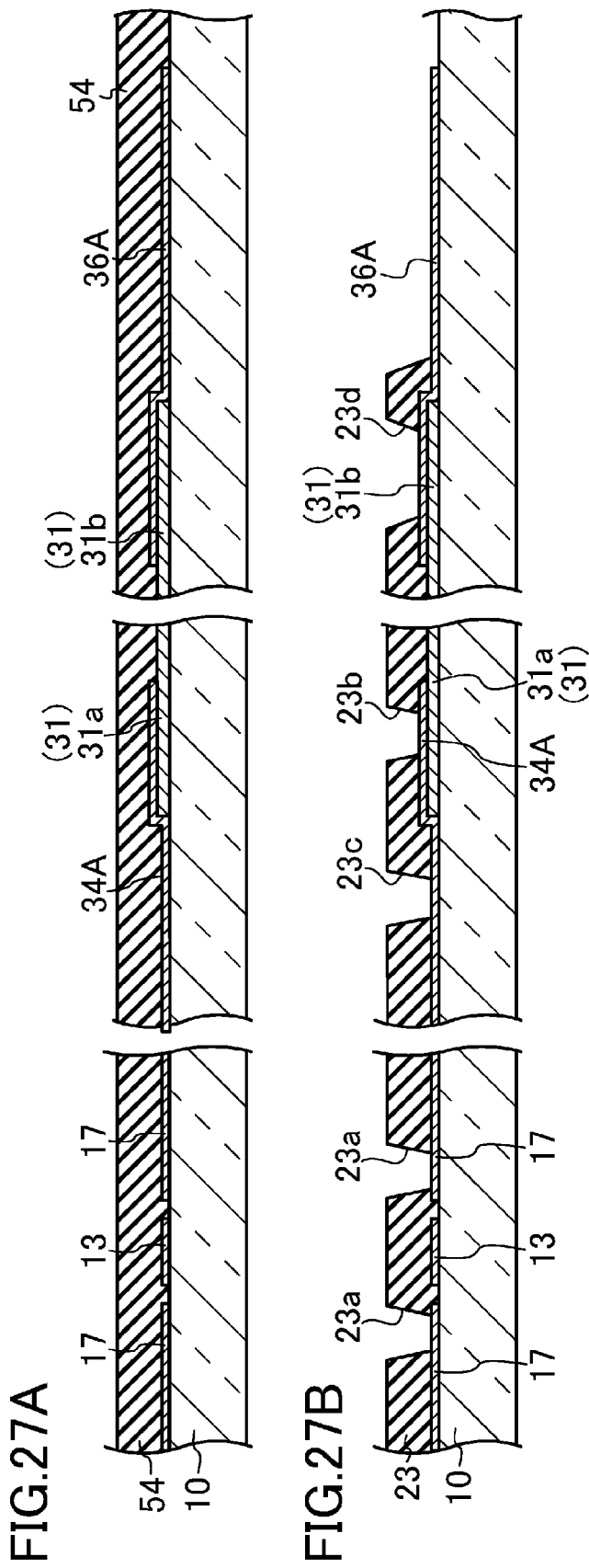

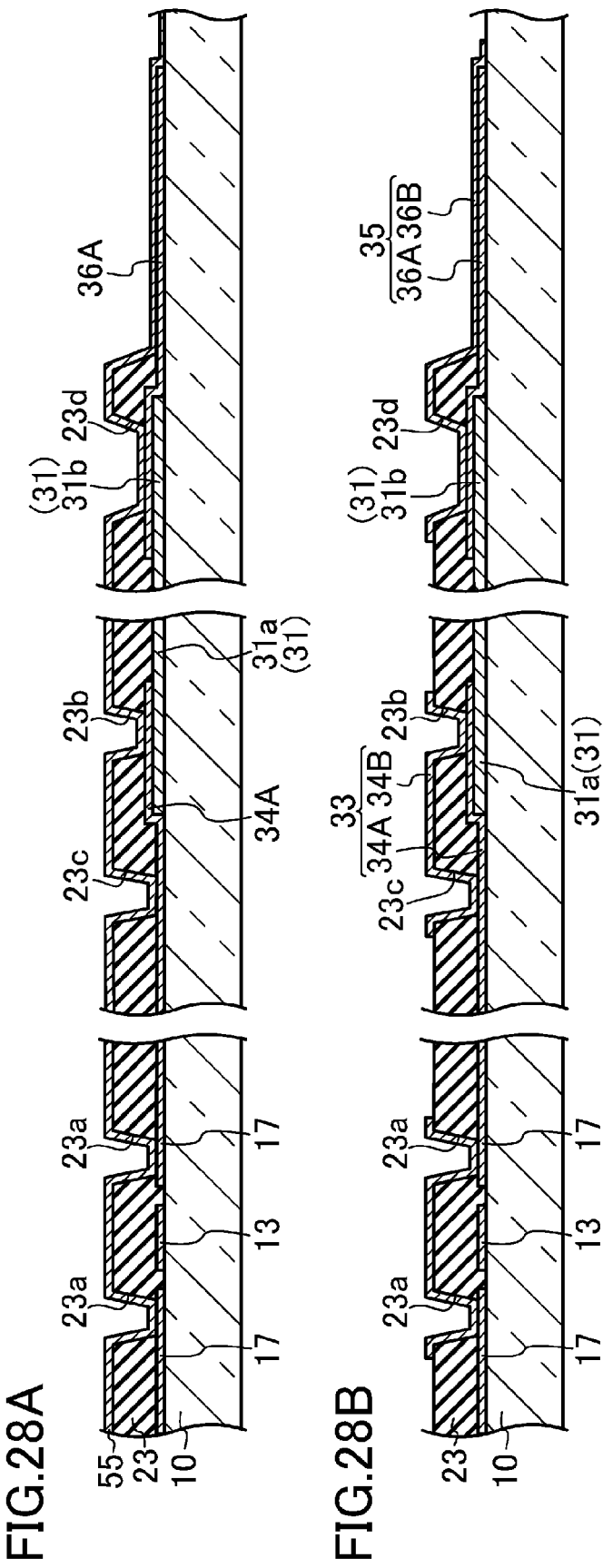

TOUCH PANEL, DISPLAY DEVICE INCLUDING THE TOUCH PANEL, AND METHOD OF MANUFACTURING THE TOUCH PANEL

TECHNICAL FIELD

The present disclosure relates to touch panels, display devices including the touch panels, and methods of manufacturing the touch panels, and more particularly to measures against deterioration in detection of touch positions.

BACKGROUND ART

A touch panel is an input device provided on a display panel such as a liquid crystal display panel and a plasma display panel to form a display device, and inputting information to the body of the display device by performing various types of operation on a screen of the display panel using a finger, a pen, etc.

Touch panels are classified into resistive-film, capacitive, infrared, ultrasonic wave, electromagnetic induction touch panels, etc., depending on their principles of operation. Of these, capacitive touch panels are relatively less likely to lose the optical characteristics of display devices, and are thus known as suitable for the display devices. In particular, projected capacitive touch panels are capable of multipoint detection of contact bodies such as fingers, and has thus excellent control characteristics of inputting complicated instructions.

A projected capacitive touch panel includes a touch region capable of detecting touch positions located in a region corresponding to a display region, and a picture-frame region in a region corresponds to a non-display region outside the display region. In the touch region, as electrodes for touch position detection, a plurality of first electrode groups, each of which includes a plurality of first electrodes aligned in one direction, are arranged in parallel, and a plurality of second electrode groups, each of which includes a plurality of second electrodes aligned in the direction orthogonal to the first electrode groups, are arranged in parallel. The first electrodes and the second electrodes are made of transparent conductive oxide such as indium tin oxide (hereinafter referred to as ITO) having low conductivity to make the screen of the display panel see-through.

Each adjacent pair of the first electrodes of the first electrode groups is connected by a first connecting portion. Each adjacent pair of the second electrodes of the second electrode groups is connected by a second connecting portion. The first connecting portion and the second connecting portion are made of transparent conductive oxide, similar to the first electrodes and the second electrodes. In each of intersections between the first electrode groups and the second electrode groups, the first connecting portion and the second connecting portion are provided with an interlayer insulating film interposed therebetween to be insulated from each other. The first electrode groups and the second electrode groups are electrically connected to different lead lines drawn in the picture-frame region from the touch region to a terminal region located at an end of the picture-frame region.

An internal connecting terminal, which is connected to one of the first electrode groups or the second electrode groups, is provided at the lead base end of each lead line. On the other hand, an external connecting terminal is provided at the top of each lead line. Each external connecting terminal is connected to a capacitance detection circuit, which applies AC voltages to the corresponding first and second electrode groups, and detects the capacitance at the portions corresponding to the first electrodes and the second electrodes. Each of the first electrodes, the second electrodes, and the lead lines is covered by a protective insulating film.

In this touch panel, when the insulating film is touched in the touch region, ones of the first electrodes and the second electrodes in the touch position are grounded via a capacitance generated between the electrodes and a contact body such as a finger, and via a human body. At this time, a change in the capacitance generated between the contact body and the ones of the first and second electrodes in the touch position is detected by the capacitance detection circuit. In this way, the touch position is detected based on the change in the capacitance.

In such a projected capacitive touch panel, lead lines are not necessarily transparent and are made of a highly conductive metal material such as copper (Cu) and aluminum (Al), which is used a conventional interconnect material. On the other hand, the internal connecting terminals and the external connecting terminals are made of transparent conductive oxide such as ITO as well as electrodes (i.e., first and second electrodes) for touch position detection. (See, for example, PATENT DOCUMENT1.)

CITATION LIST

Patent Document

PATENT DOCUMENT1: Japanese Patent Application No. 2010-257442

SUMMARY OF THE INVENTION

Technical Problem

In the above-described projected capacitive touch panel, however, since adjacent pairs of the first electrode groups and the second electrode groups are located close to each other to achieve highly precise touch position detection, adjacent pairs of the internal connecting terminals are inevitably located close to each other, thereby inevitably reducing the terminal widths.

In addition, in order to prevent the phenomenon (what is called "visible bone structure") where patterns of the electrodes for touch position detection are visible, caused by a difference in the light transmittance between the portion provided with the electrodes for touch position detection and spaces between the electrodes, the electrodes for touch position detection are formed as thin as possible. Thus, the internal connecting terminals formed together with the electrodes for touch position detection are made of transparent conductive oxide having low conductivity, and in addition, formed as thin films.

As a result, the electrical resistance of the internal connecting terminals is relatively high. Therefore, poor conduction occurs between the electrodes for touch position detection and the capacitance detection circuit, thereby damaging the function of touch position detection.

However, where the internal connecting terminals are made of a material having higher conductivity than the electrodes for touch position detection, or are formed as thicker films than the electrodes for touch position detection, there is a need to add a step of forming the internal connecting terminals individually from the step of forming the electrodes for touch position detection, thereby increasing the manufacturing steps to increase the manufacturing costs.

The present disclosure was made in view of the foregoing, and it is an objective of the present disclosure to reduce the electrical resistance of internal connecting terminals without increasing the manufacturing costs to provide an excellent function of touch position detection.

Solution to the Problem

In order to achieve the objective, in the present disclosure, an internal connecting terminal has a parallel connection structure of two layers connected in parallel to a lead line, and the parallel connection structure is formed of the same film as existing conductive patterns for touch position detection located on and under an interlayer insulating film.

Specifically, the present disclosure provides a touch panel, a display device including the touch panel, and a method of manufacturing the touch panel. The touch panel includes a touch region for detecting a touch position touched by a contact body; a terminal region provided outside the touch region and connected to an external circuit; a first conductive pattern for touch position detection located in the touch region and made of transparent conductive oxide; an interlayer insulating film provided to cover at least part of the first conductive pattern; a second conductive pattern for touch position detection provided on the interlayer insulating film and made of transparent conductive oxide; a protection insulating film provided to cover the second conductive pattern; a lead line drawn from the touch region to the terminal region, and covered by the insulating film; and an internal connecting terminal connected to at least one of the first conductive pattern or the second conductive pattern, and connected to a lead base end of the lead line, and electrically connecting a conductive pattern inside the touch region to the lead line. The present disclosure provides the following solution.

Specifically, in the touch panel according to a first aspect of the invention, the internal connecting terminal includes a first interconnect layer formed of a same film as the first conductive pattern, and a second interconnect layer formed of a same film as the second conductive pattern. The first and the second interconnect layers are electrically connected to the lead line at a portion overlapping the lead line, and are electrically connected together at a portion outside the lead line.

In this first aspect of the invention, the internal connecting terminal has a parallel connection structure of the first interconnect layer and the second interconnect layer, which are connected in parallel to the lead line. The electrical resistance of the parallel connection structure is the sum of the inverse of the electrical resistance value of the first interconnect layer and the inverse of the electrical resistance value of the second interconnect layer. This reduces the electrical resistance of the internal connecting terminal as compared to the case where the internal connecting terminal is a single layer connected in series to the lead line and made of transparent conductive oxide.

The first interconnect layer is formed of the same film as the first conductive pattern, and the second interconnect layer is formed of the same film as the second conductive pattern. That is, the internal connecting terminal can have the above-described parallel connection structure by utilizing the existing steps of forming the first conductive pattern and the second conductive pattern. Thus, there is no need to add a step of forming the internal connecting terminal independently from the steps of forming the first conductive pattern and the second conductive pattern not to increase the manufacturing steps.

Therefore, according to the first aspect of the invention, the electrical resistance of the internal connecting terminal decreases without increasing the manufacturing costs to obtain an excellent function of touch position detection.

According to a second aspect of the invention, in the touch panel according to the first aspect of the invention, contact holes are formed in the interlayer insulating film at a portion overlapping the lead base end of the lead line, and a portion outside the lead line. The second interconnect layer is electrically connected to the lead line at the portion overlapping the lead line and is electrically connected to the first interconnect layer at the portion outside the lead line via the contact holes.

In this second aspect of the invention, the second interconnect layer is electrically connected to the lead line and the first interconnect layer via the different contact holes formed in the interlayer insulating film. This aspects also provides the internal connecting terminal having a parallel connection structure in which the first interconnect layer and the second interconnect layer are connected in parallel to the lead line, thereby specifically providing the effects and advantages of the first aspect of the invention.

According to a third aspect of the invention, in the touch panel according to the first aspect of the invention, an opening, which is open from a portion overlapping the lead base end of the lead line to a portion outside the lead line, is formed in the interlayer insulating film. The second interconnect layer is electrically connected to the lead line at the portion overlapping the lead line inside the opening, and is electrically connected to the first interconnect layer at the portion outside the lead line.

In this third aspect of the invention, the second interconnect layer is electrically connected to the lead line and the first interconnect layer via the single opening formed in the interlayer insulating film from the lead base end of the lead line to the portion outside the lead line. In this aspect, as compared to the second aspect where the second interconnect layer is electrically connected to the lead line and the first interconnect layer via the different contact holes, the contact area between the lead line and the first and the second interconnect layers increases to reduce the contact resistance between the lead line and the first and the second interconnect layers. This greatly prevents poor conduction between the internal connecting terminal and the lead line.

According to a fourth aspect of the invention, in the touch panel according to any one of the first to third aspects of the invention, the lead line is formed by stacking a first interconnect layer formed of a same film as the first conductive pattern, and a second interconnect layer made of a metal material.

In this fourth aspect of the invention, the lead line has the multilayer of the first interconnect layer and the second interconnect layer. This lead line having the multilayer is thick as compared to the case where the lead line is a layer made of only a metal material corresponding to that of the second interconnect layer, since the multilayer has one layer (i.e., the first interconnect layer) more to form the lead line. This reduces the resistance of the lead line.

In addition, the first interconnect layer is formed of the same film as the first conductive pattern. That is, the lead line can have the above-described multilayer by utilizing the existing step of forming the first conductive pattern not to increase the manufacturing steps.

According to a fifth aspect of the invention, in the touch panel according to any one of the first to fourth aspects of the invention, one of the first conductive pattern or the second conductive pattern includes a plurality of first electrode groups arranged in parallel, each including a plurality of first electrodes aligned in one direction, a plurality of second electrode groups arranged in parallel, each including a plurality of second electrodes aligned in a direction intersecting the first electrode groups, and a first connecting portion connecting each adjacent pair of the first electrodes of the first electrode groups. The other one of the first conductive pattern or the second conductive pattern includes a second connecting portion connecting each adjacent pair of the second electrodes of the second electrode groups.

In this fifth aspect of the invention, a projected capacitive touch panel can be specifically implemented. In the touch panel, the first electrode groups and the second electrode groups are provided in the same layer, thereby causing a change in the capacitance generated between a contact body such as a finger and the first and second electrodes in the touch position to the same extent. This reduces the difference in the sensitivity of the change in the capacitance between the first electrodes and the second electrodes, thereby enabling highly sensitive detection of the touch position.

According to an sixth aspect of the invention, in the touch panel according to any one of the first to fifth aspects of the invention, the transparent conductive oxide forming the first conductive pattern and the second conductive pattern is ITO or indium zinc oxide (hereinafter referred to as IZO).

In this sixth aspect of the invention, the first conductive pattern and the second conductive pattern are made of ITO or IZO. ITO and IZO have conductivity and relatively high transparency to make the touch region transparent, and the screen of the display panel greatly see-through.

A seventh aspect of the invention provides a display device including the touch panel of any one of the first to the sixth aspects of the invention.

In this seventh aspect of the invention, the touch panel according to the first to sixth aspect of the invention has great characteristics of reducing the electrical resistance of the internal connecting terminal without increasing the manufacturing costs to provide an excellent function of touch position detection. Thus, a display device, which accurately inputs information by performing various types of control using a contact body such as a finger or a pen, is provided at low costs.

According to an eighth aspect of the invention, in the display device according to the seventh aspect of the invention, the touch panel is directly formed on a substrate surface forming a display panel.

In this eighth aspect of the invention, since the touch panel is directly formed on the substrate surface forming the display panel, the display device, which includes the touch panel having an excellent function of touch position detection, is formed thin as a whole.

A ninth aspect of the invention provides a method of manufacturing the touch panel of according to the first aspect of the invention. The method includes a first patterning step of forming the first conductive pattern and the first interconnect layer by forming a transparent conductive film made of transparent conductive oxide on a base substrate, and patterning the transparent conductive film using a first photomask; a second patterning step of forming the lead line to be connected to the first interconnect layer by forming a metal film to cover the first conductive pattern and the first interconnect layer, and patterning the metal film using a second photomask; a third patterning step of forming the interlayer insulating film to expose at least part of the first interconnect layer and the lead line by forming an insulating film to cover the first conductive pattern, the first interconnect layer, and the lead line, and patterning the insulating film using a third photomask; a fourth patterning step of forming the second conductive pattern, and forming the second interconnect layer to be connected to the first interconnect layer and the lead line by forming a transparent conductive film made of transparent conductive oxide on the interlayer insulating film, and patterning the transparent conductive film using a fourth photomask; and a fifth patterning step of forming the protection insulating film by forming an insulating film to cover the second conductive pattern and the second interconnect layer, and patterning the insulating film using a fifth photomask.

In this ninth aspect of the invention, in the first patterning step, the first conductive pattern and the first interconnect layer are formed of the same film using the single photomask. In the second patterning step, the second conductive pattern and the second interconnect layer are formed of the same film using the single photomask. As such, the first interconnect layer and the second interconnect layer are formed utilizing the existing steps of forming the first conductive pattern and the second conductive pattern, and the internal connecting terminal can have the above-described parallel connection structure without increasing the manufacturing steps. This reduces the electrical resistance of the internal connecting terminal without increasing the manufacturing costs to manufacture the touch panel according to the first aspect of the invention, which has an excellent function of touch position detection.

A tenth aspect of the invention provides a method of manufacturing the touch panel according to the first aspect of the invention. The method includes a first patterning step of forming the lead line by forming a metal film on a base substrate, and pattering the metal film using a first photomask; a second patterning step of forming the first conductive pattern, and forming the first interconnect layer to partially overlap and to be connected to the lead line by forming a transparent conductive film made of transparent conductive oxide to cover the lead line, and patterning the transparent conductive film using a second photomask; a third patterning step of forming the interlayer insulating film to expose at least part of the lead line or the first interconnect layer at a portion overlapping the lead line, and part of the first interconnect layer at a portion outside the lead line by forming an insulating film to cover the lead line, the first conductive pattern, and the first interconnect layer, and patterning the insulating film using a third photomask; a fourth patterning step of forming the second conductive pattern, and forming the second interconnect layer to be connected to the lead line or the first interconnect layer at a portion overlapping the lead line, and to the first interconnect layer at a portion outside the lead line by forming a transparent conductive film made of transparent conductive oxide on the interlayer insulating film, and patterning the transparent conductive film using a fourth photomask; and a fifth patterning step of forming the protection insulating film by forming an insulating film to cover the second conductive pattern and the second interconnect layer, and patterning the insulating film using a fifth photomask.

In this tenth aspect of the invention as well, the first interconnect layer and the second interconnect layer are formed utilizing the existing steps of forming the first conductive pattern and the second conductive pattern, and the internal connecting terminal can have the above-described parallel connection structure without increasing the manufacturing steps. This reduces the electrical resistance of the internal connecting terminal without increasing the manufacturing costs to manufacture the touch panel according to the first aspect of the invention, which has an excellent function of touch position detection.

Advantages of the Invention

In the present disclosure, the internal connecting terminal has the parallel connection structure of the first interconnect layer and the second interconnect layer, which are connected in parallel to the lead line, and the parallel connection structure is formed of the same film as the existing first and second conductive patterns for touch position detection located on and under the interlayer insulating film. This reduces the electrical resistance of the internal connecting terminal without increasing the manufacturing costs to provide an excellent function of touch position detection. As a result, poor conduction between the conductive patterns for touch position detection and external circuits can be prevented, and a display device, which accurately inputs information by performing various types of operation using a contact body such as a finger or a pen, is provided at low costs.

BRIEF DESCRIPTION OF THE DRAWINGS

FIG. 1 is a cross-sectional view illustrating the cross-sectional structure of a liquid crystal display device according to a first embodiment.

FIG. 2 is a top view schematically illustrating the structure of a touch panel according to the first embodiment.

FIGS. 10A and 10B are cross-sectional views illustrating portions corresponding to FIGS. 4, 6, and 8 in a first patterning step of the method of manufacturing the touch panel according to the first embodiment.

FIGS. 11A and 11B are cross-sectional views illustrating the portions corresponding to FIGS. 4, 6, and 8 in a second patterning step of the method of manufacturing the touch panel according to the first embodiment.

FIGS. 12A and 12B are cross-sectional views illustrating the portions corresponding to FIGS. 4, 6, and 8 in a third patterning step of the method of manufacturing the touch panel according to the first embodiment.

FIGS. 13A and 13B are cross-sectional views illustrating the portions corresponding to FIGS. 4, 6, and 8 in a fourth patterning step of the method of manufacturing the touch panel according to the first embodiment.

FIGS. 14A and 14B are cross-sectional views illustrating the portions corresponding to FIGS. 4, 6, and 8 in a fifth patterning step of the method of manufacturing the touch panel according to the first embodiment.

FIGS. 25A and 25B are cross-sectional views illustrating portions corresponding to FIGS. 4, 22, and 24 in a first patterning step of a method of manufacturing the touch panel according to the second embodiment.

FIGS. 26A and 26B are cross-sectional views illustrating the portions corresponding to FIGS. 4, 22, and 24 in a second patterning step of the method of manufacturing the touch panel according to the second embodiment.

FIGS. 27A and 27B are cross-sectional views illustrating the portions corresponding to FIGS. 4, 22, and 24 in a third patterning step of the method of manufacturing the touch panel according to the second embodiment.

FIGS. 28A and 28B are cross-sectional views illustrating the portions corresponding to FIGS. 4, 22, and 24 in a fourth patterning step of the method of manufacturing the touch panel according to the second embodiment.

DESCRIPTION OF EMBODIMENTS

Figure 3:
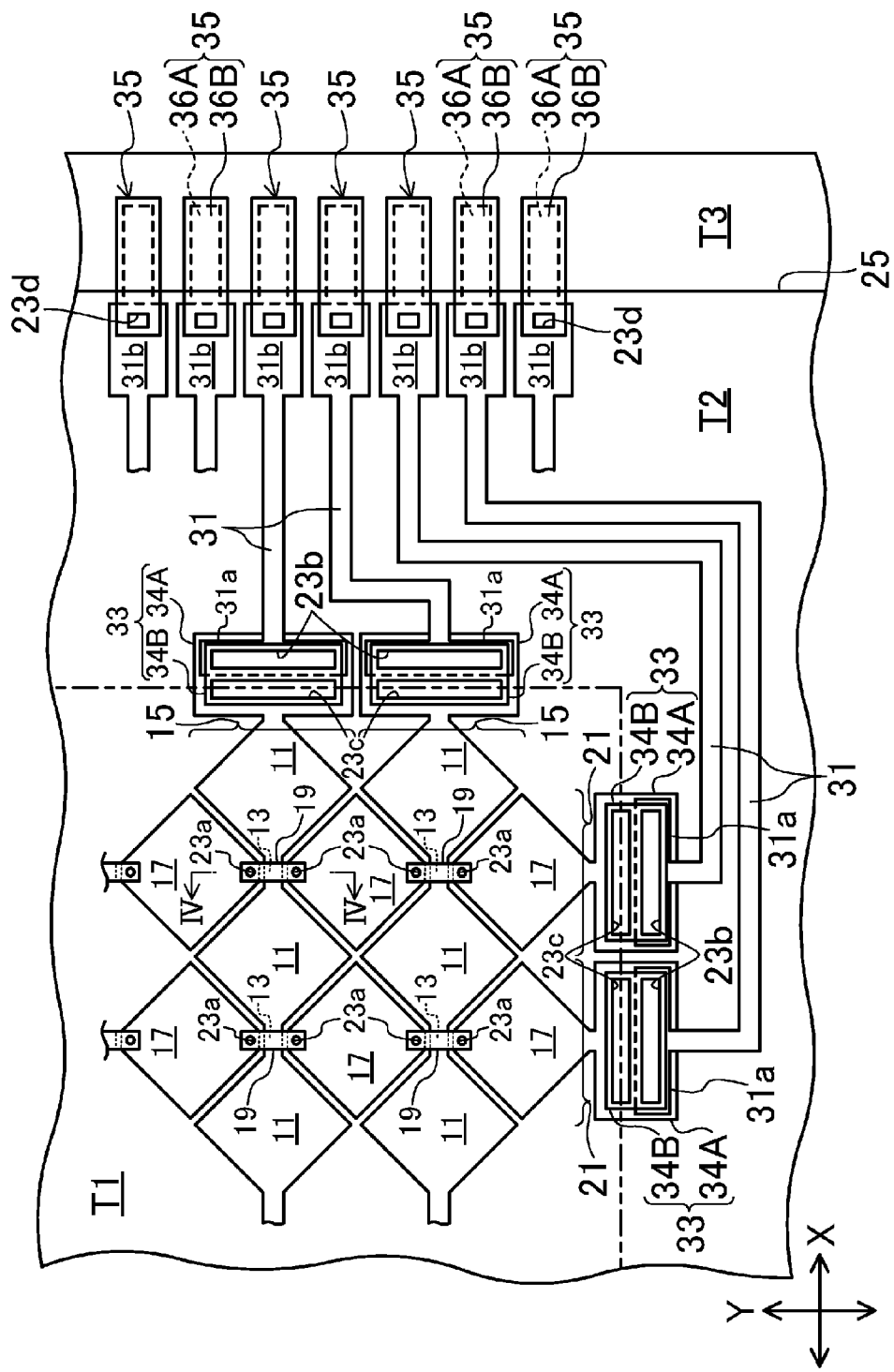
FIG. 3 is an enlarged top view illustrating the connection between electrodes for touch position detection and external connecting terminals in the touch panel according to the first embodiment.

Embodiments of the present disclosure will be described hereinafter in detail with reference to the drawings. The present disclosure is not limited to the following embodiments.

First Embodiment of Invention

In this first embodiment, a liquid crystal display device S including a liquid crystal display panel DP as a display panel will be described as an example display device.

Structure of Liquid Crystal Display Device S

FIG. 1 illustrates the cross-sectional structure of the liquid crystal display device S.

The liquid crystal display device S is a transmissive liquid crystal display device with a touch panel TP, and includes the liquid crystal display panel DP, a back light unit BL, which is a light source device provided above the back surface of the liquid crystal display panel DP, and the touch panel TP provided on the front surface of the liquid crystal display panel DP, i.e., opposite to the back light unit BL.

Structure of Liquid Crystal Display Panel DP

The liquid crystal display panel DP includes a thin film transistor (hereinafter referred to as TFT) substrate 1 and a counter substrate 3, which face each other, a frame-like sealing material 5, which bonds the peripheral edges of the TFT substrate 1 and the counter substrate 3 together, and a liquid crystal layer 7 encapsulated between the TFT substrate 1 and the counter substrate 3, and surrounded by the sealing material 5.

This liquid crystal display panel DP has a display region D displaying images in a region, in which the TFT substrate 1 overlaps the counter substrate 3, at the inner side of the sealing material 5, i.e., in the region provided with the liquid crystal layer 7. The display region D is formed by arranging a plurality of pixels, which are minimum units of an image, in a matrix. The liquid crystal display panel DP has, outside the display region D, a terminal region (not shown), in which the TFT substrate 1 extends beyond the counter substrate 3 and is exposed to the outside. In this terminal region, integrated circuit chips and a circuit board are mounted with anisotropic conductive films etc. interposed therebetween, and signals for display are input from an external circuit to the liquid crystal display panel DP.

Although not shown, the TFT substrate 1 includes, on an insulating substrate such as a glass substrate, which is a base substrate, a plurality of gate interconnects extending in parallel, a plurality of source interconnects extending in parallel in the direction intersecting the gate interconnects, TFTs provided at respective intersections between the gate interconnects and the source interconnects to correspond to the pixels, and pixel electrodes connected to the drains of the TFTs. The on/off state of the TFTs is switched, thereby selectively applying potential to the pixel electrodes corresponding to the TFTs.

Although not shown, the counter substrate 3 includes, on an insulating substrate 10 such as a glass substrate, which is a base substrate, a black matrix provided in a lattice to correspond to the gate interconnects and the source interconnects, a plurality of color filters of red layers, green layers, and blue layers, which are periodically arranged within the lattice of the black matrix to correspond to the pixels, a common electrode provided to cover the black matrix and the color filters and facing a group of the pixel electrodes, and a photo spacer provided in a pillar on the common electrode.

The TFT substrate 1 and the counter substrate 3 are formed, for example, in a rectangle shape, and provided with alignment films (not shown) on the inner surfaces facing each other. Polarizing plates (not shown) are provided on the outer surface of the TFT substrate 1, and the outer surface of the touch panel TP located on the counter substrate 3. The liquid crystal layer 7 is made of a nematic liquid crystal material etc. having electro-optical characteristics.

Structure of Back Light Unit BL

Although not shown, the back light unit BL includes a light source such as a light-emitting diode (LED) and a cold cathode fluorescent tube, a light guide plate, and a plurality of optical sheets such as prism sheets; and emits light, which is incident from the light source to the light guide plate, as light with a uniform plane from a light-emitting surface of the light guide plate to the liquid crystal display panel DP via the optical sheets.

Display Operation of Liquid Crystal Display Device S

In each pixel of the liquid crystal display panel DP having the above-described structure, when a gate signal is sent to the gate of one of the TFTs via a gate interconnect to turn on the TFT, a source signal is sent to the source of the TFT via a source interconnect to write predetermined charge in the corresponding one of the pixel electrodes via the TFT. At this time, a potential difference arises between the pixel electrode of the TFT substrate 1 and the common electrode of the counter substrate 3, thereby applying a predetermined voltage to the liquid crystal layer 7. In the liquid crystal display device S, the alignment of liquid crystal molecules changes depending on the magnitude of the voltage applied to the liquid crystal layer 7 to control the transmittance of the light from the back light unit BL in the liquid crystal layer 7, thereby displaying an image.

Structure of Touch Panel TP

Figure 4:
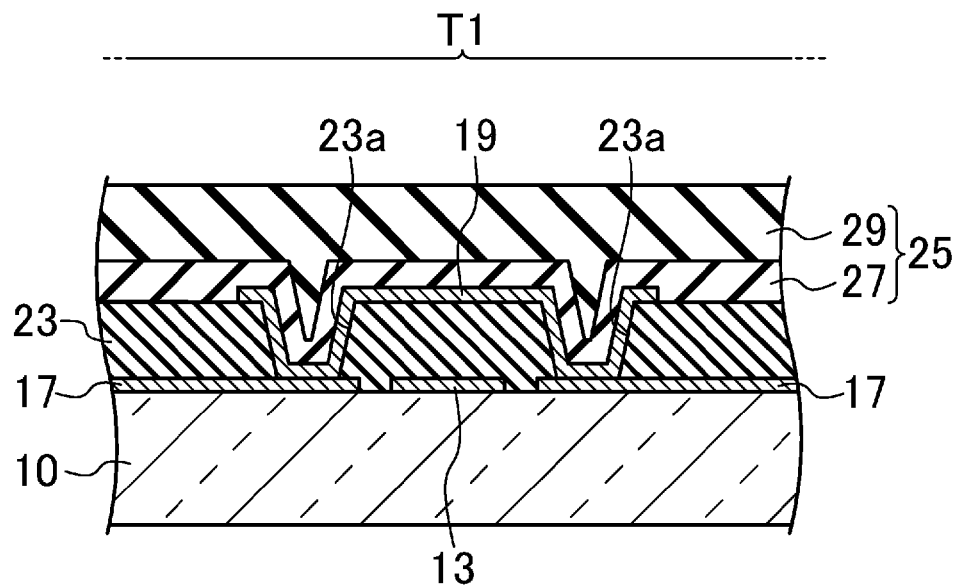
FIG. 4 is a cross-sectional view illustrating the cross-sectional structure taken along the line IV-IV of FIG. 3.
Figure 5:
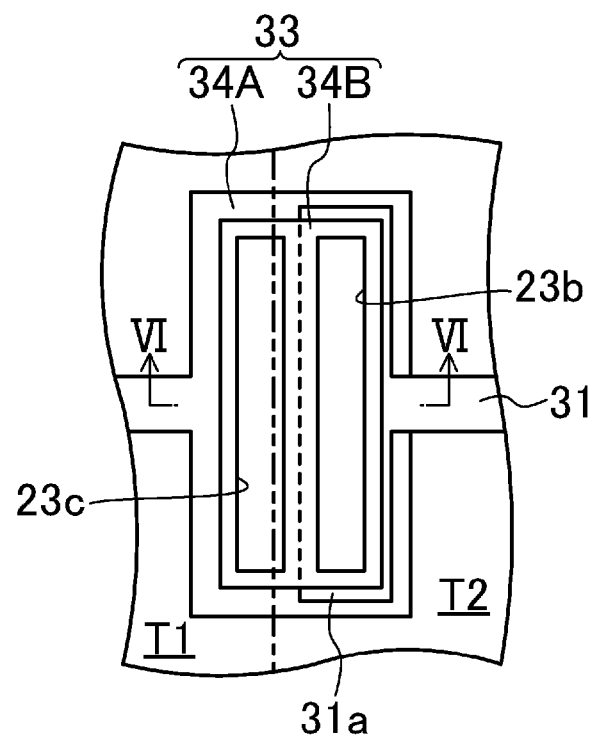
FIG. 5 is an enlarged top view illustrating the connection between an internal connecting terminal and a lead line according to the first embodiment.
Figure 6:
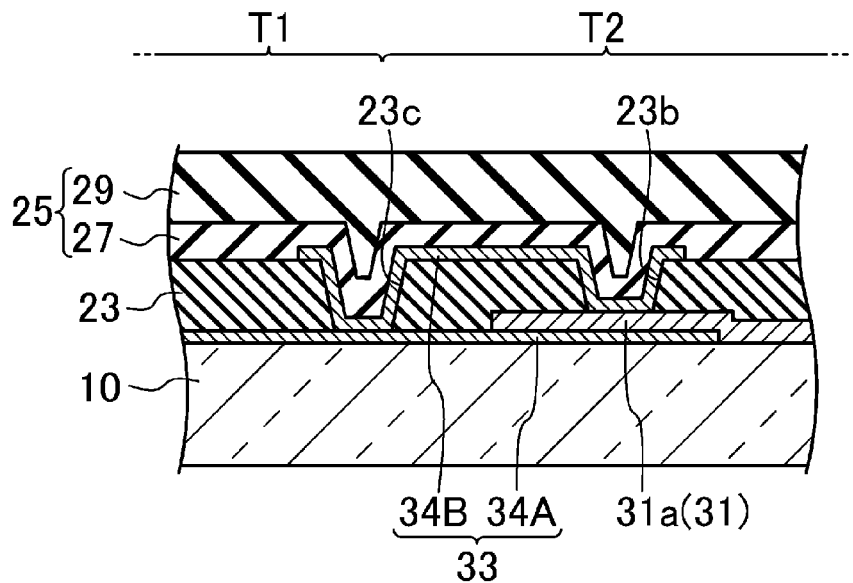
FIG. 6 is a cross-sectional view illustrating the cross-sectional structure taken along the line VI-VI of FIG. 5.
Figure 7:
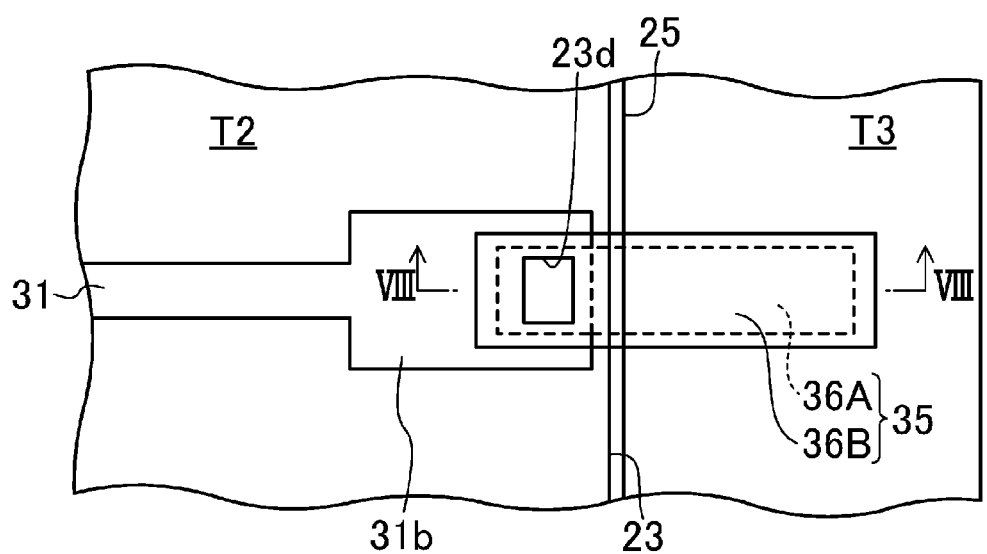
FIG. 7 is an enlarged top view illustrating the connection between an external connecting terminal and a lead line according to the first embodiment.
Figure 8:
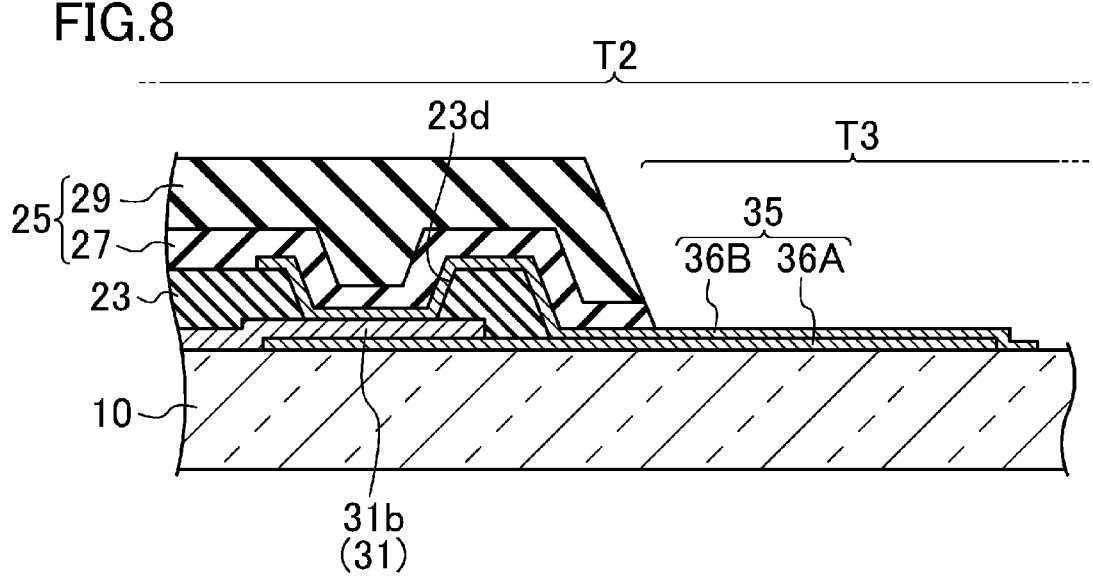
FIG. 8 is a cross-sectional view illustrating the cross-sectional structure taken along the line VIII-VIII of FIG. 7.

FIGS. 2-8 illustrate the structure of the touch panel TP. FIG. 2 is a schematic top view illustrating the whole structure of the touch panel TP. FIG. 3 is an enlarged top view illustrating the connection between the electrodes 11 and 17 for touch position detection and external connecting terminals 35 in the touch panel TP. FIG. 4 is a cross-sectional view illustrating the cross-sectional structure taken along the line IV-IV of FIG. 3. FIG. 5 is an enlarged top view illustrating the connection between each internal connecting terminal 33 and the corresponding lead line 31. FIG. 6 is a cross-sectional view illustrating the cross-sectional structure taken along the line VI-VI of FIG. 5. FIG. 7 is an enlarged top view illustrating the connection between each external connecting terminal 35 and the corresponding lead line 31. FIG. 8 is a cross-sectional view illustrating the cross-sectional structure taken along the line VIII-VIII of FIG. 7.

The touch panel TP according to this embodiment is directly formed on the outer surface of the counter substrate 3 forming the liquid crystal display panel DP to form the liquid crystal display device S with the touch panel thin as a whole. The touch panel TP is a projected capacitive touch panel. The touch panel includes, as shown in FIG. 2, for example, a rectangular touch region T1 for detecting a touch position touched by a contact body (e.g., a finger of a user); for example, a rectangular picture-frame region T2 surrounding the touch region T1 and not capable of detecting the touch position; and a terminal region T3 provided at one side of the picture-frame region T2 (on the right in FIG. 2) along the edge of the counter substrate 3. The touch region T1 is located in a region corresponding to the display region D of the liquid crystal display panel DP, and the picture-frame region T2 is located in the region corresponding to a non-display region.

The touch panel TP includes the electrodes 11 and 17 for touch position detection located in the touch region T1, the plurality of lead lines 31 electrically connected to the electrodes 11 and 17 for touch position detection, and drawn from the touch region T1 to the terminal region T3 in the picture-frame region T2, the internal connecting terminals 33 provided at the portions from which the lead lines are drawn, the external connecting terminals 35 provided at the portions to which the lead lines 31 are drawn and arranged in the terminal region T3, and a controller 41 which is an external circuit electrically connected to the external connecting terminals 35.

Structures of Electrodes 11 and 17 for Touch Position Detection

The electrodes 11 and 17 for touch position detection are a plurality of first electrodes 11 (outline electrodes in FIG. 2) arranged in a matrix, and a plurality of second electrodes 17 (shadow electrodes in FIG. 2) also arranged in a matrix. The first electrodes 11 and the second electrodes 17 alternately arranged in an oblique direction in FIG. 2 to form a honeycomb as a whole.

The first electrodes 11 are formed in, for example, a substantial rectangular shape, and arranged at predetermined intervals so that their corners face in the horizontal direction (i.e., the X-axis direction) and the vertical direction (i.e., the Y-axis direction) in FIG. 2. As shown in FIG. 3, adjacent pairs of the plurality of first electrodes 11 aligned in the X-axis direction are connected by the first connecting portions 13 and integrally formed, thereby forming each first electrode group 15. That is, the first electrodes 11 and the first connecting portions 13 are alternately arranged in the X-axis direction. The plurality of first electrode groups 15, each of which is a line of the first electrodes 11 integrally formed with the first connecting portions 13 interposed therebetween, are arranged in parallel in the Y-axis direction. The first electrodes 11 and the first connecting portions 13 are made of ITO, IZO, etc.

The second electrodes 17 are also formed in, for example, a substantial rectangular shape, and arranged at predetermined intervals so that their corners face in the X-axis direction and the Y-axis direction. Adjacent pairs of the plurality of second electrodes 17 aligned in the Y-axis direction are connected and electrically coupled by the second connecting portions 19, thereby forming each second electrode group 21. That is, the second electrodes 17 and the second connecting portions 19 are alternately arranged in the Y-axis direction. The plurality of second electrode groups 21, each of which is a line of the second electrodes 17 electrically connected via the second connecting portions 19, are arranged in parallel in the X-axis direction. The second electrodes 17 and the second connecting portions 19 are also made of ITO, IZO, etc.

As shown in FIG. 4, the first electrode groups 15 (i.e., the first electrodes 11), the first connecting portions 13, and the second electrode groups 21 (i.e., the second electrodes 17) are formed on the outer surface of the insulating substrate 10 forming the counter substrate 3, and covered by an interlayer insulating film 23. On the other hand, the second connecting portions 19 are provided on the interlayer insulating film 23, and covered by a protection insulating film 25 provided on the interlayer insulating film 23 as well. The second connecting portions 19 form a cross-linked structure extending over the first connecting portions 13 with the interlayer insulating film 23 interposed therebetween, and are connected to the corners of the adjacent second electrodes 17 via contact holes 23a formed in the interlayer insulating film 23.

As such, in this embodiment, the first electrode groups 15 and the second electrode groups 21 are provided in the same layer, thereby causing a change in the capacitance generated between a contact body such as a finger and the first and second electrodes 11 and 17 in the touch position to the same extent. This reduces the difference in the sensitivity of the change in the capacitance between the first electrodes 11 and the second electrodes 17, thereby enabling highly sensitive detection of the touch position.

In this embodiment, the first electrode groups 15 (i.e., the first electrodes 11), the first connecting portions 13, and the second electrode groups 21 (i.e., the second electrodes 17) form the first conductive pattern for touch position detection of the present disclosure. The second connecting portions 19 form the second conductive pattern for touch position detection of the present disclosure.

The protection insulating film 25 is formed by stacking a first protection insulating film 27 made of silicon nitride (SiN) etc., and a second protection insulating film 29 made of an acrylic-based organic insulating material; and covers the interlayer insulating film 23. The interlayer insulating film 23 and the protection insulating film 25 are not formed in the terminal region T3 to expose the external connecting terminals 35 to the outside.

Structure of Lead Line 31

As shown in FIG. 3, each lead line 31 extends from the periphery of the touch region T1 to the position short of the terminal region T3. The lead line 31 is covered by the interlayer insulating film 23 and the protection insulating film 25, and the entire lead 31 is located at the inner side of the outer edges of both the insulating films 23 and 25 as shown in FIGS. 3 and 7. Then, the two insulating films of the interlayer insulating film 23 and the protection insulating film 25 block moisture etc. entering from the outside to the lead line 31, thereby greatly preventing corrosion of the lead line 31.

The lead line 31 is formed by sequentially stacking, for example, a molybdenum-niobium (MoNb) alloy layer, an aluminum (Al) layer, and a molybdenum-niobium (MoNb) alloy layer; a molybdenum nitride (MoN) layer, an aluminum (Al) layer, and a molybdenum nitride (MoN) layer; or a molybdenum (Mo) layer, an aluminum (Al) layer, and a molybdenum (Mo) layer.

A lead base end 31a of each lead line 31 is connected to an internal connecting terminal 33, which is connected to one of the first electrode groups 15 or the second electrode groups 21. On the other hand, a lead top 31b of each lead line 31 is connected to one of the external connecting terminals 35.

As shown in FIG. 3, numbers of internal connecting terminals 33 are aligned along the periphery of the touch region T1. As shown in FIGS. 5 and 6, each internal connecting terminal 33 includes a first internal interconnect layer 34A being a first interconnect layer, and a second internal interconnect layer 34B being a second interconnect layer. The first internal interconnect layer 34A and the second internal interconnect layer 34B are connected in parallel to one of the lead lines 31 to form a parallel connection structure.

The first internal interconnect layer 34A is integrally formed with the one of the first electrodes 11, which is located at one end of the corresponding first electrode group 15, or the one of the second electrodes 17, which is located at one end of the corresponding second electrode group 21. The first internal interconnect layer 34A is provided under the lead line 31, and connected to the lower surface of the lead line 31. On the other hand, the second internal interconnect layer 34B is provided on the interlayer insulating film 23 from the portion overlapping the lead base end 31a of the lead line 31 to a portion located in the touch region T1 (in the left of FIG. 5) outside the lead line 31 over the base end of the lead line 31. The second internal interconnect layer 34B is connected to the upper surface of the lead base end 31a of the lead line 31 via a contact hole 23b formed in the interlayer insulating film 23 at the portion overlapping the first internal interconnect layer 34A. Also, this second internal interconnect layer 34B is connected to the first internal interconnect layer 34A via a contact hole 23c formed in the interlayer insulating film 23 at a portion located outside the lead line 31 and closer to the touch region T1 (in the left of FIG. 5) than the lead line 31.

This parallel connection structure greatly reduces the electrical resistance of the internal connecting terminal 33. Specifically, since the internal connecting terminal 33 includes the first internal interconnect layer 34A and the second internal interconnect layer 34B, which are connected in parallel to the lead line 31, the electrical resistance is the sum of the inverse of the electrical resistance value of the first internal interconnect layer 34A and the inverse of the electrical resistance value of the second internal interconnect layer 34B. This reduces the electrical resistance of the internal connecting terminal 33 as compared to the case where the internal connecting terminal 33 is a single layer made of transparent conductive oxide such as ITO and IZO and connected in series to the lead line 31.

Although will be described later in detail, the first internal interconnect layer 34A is formed of the same film as the first electrode groups 15 (i.e., the first electrodes 11), the first connecting portions 13, and the second electrode groups 21 (i.e., the second electrodes 17). The second internal interconnect layer 34B is formed of the same film as the second connecting portions 19.

As shown in FIG. 3, numbers of external connecting terminals 35 are drawn out of the interlayer insulating film 23 and the protection insulating film 25, and densely aligned in the terminal region T3. As shown in FIGS. 7 and 8, each external connecting terminal 35 includes a first external interconnect layer 36A and a second external interconnect layer 36B. The first external interconnect layer 36A and the second external interconnect layer 36B are connected in parallel to one of the lead lines 31 to form a parallel connection structure.

The first external interconnect layer 36A is provided under the lead line 31, is connected to the lower surface of the lead line 31, and extends from the region with the interlayer insulating film 23 and the protection insulating film 25 to the terminal region T3 outside the region. On the other hand, the second external interconnect layer 36B is provided on the interlayer insulating film 23 at the portion overlapping the lead line 31, and is connected to the upper surface of the lead line 31 at the portion overlapping the first external interconnect layer 36A via a contact hole 23d formed in the interlayer insulating film 23. This second external interconnect layer 36B also extends from the region with the interlayer insulating film 23 and the protection insulating film 25 to the terminal region T3 outside the region, and stacked on the first external interconnect layer 36A in the terminal region T3.

This parallel connection structure greatly reduces the electrical resistance of the external connecting terminal 35. Specifically, since each external connecting terminal 35 includes the first external interconnect layer 36A and the second external interconnect layer 36B, which are connected in parallel to the lead line 31, the electrical resistance is the sum of the inverse of the electrical resistance value of the first external interconnect layer 36A and the inverse of the electrical resistance value of the second external interconnect layer 36B. This reduces the electrical resistance of the external connecting terminal 35 as compared to the case where the external connecting terminal 35 is a single layer made of transparent conductive oxide such as ITO and IZO and connected in series to the lead line 31.

In addition, each external connecting terminal 35 has the multilayer structure formed by stacking the first external interconnect layer 36A and the second external interconnect layer 36B in the terminal region T3. In this multilayer portion, the external connecting terminal is thick as compared to the case where the external connecting terminal 35 is a single layer made of transparent conductive oxide such as ITO and IZO, since the portion has one layer more to form the external connecting terminal 35, thereby greatly preventing the electrical resistance.

Although will be described later in detail, the first external interconnect layer 36A is formed of the same film as the first electrode groups 15 (i.e., the first electrodes 11), the first connecting portions 13, and the second electrode groups 21 (i.e., the second electrodes 17). The second external interconnect layer 36B is formed of the same film as the second connecting portions 19.

Structure of Controller 41

The controller 41 is mounted as a driver integrated circuit in the terminal region T3, for example, by a technique called "tape automated bonding (TAB)." The controller 41 includes, as a detection circuit 43, a capacitance detection circuit detecting a change in the capacitance generated between a contact body and ones of the first electrodes 11 and the second electrodes 17 in a touch position when the touch region T1 is touched by the contact body, or an impedance detection circuit detecting a change in the impedance generated by touch in the ones of the first electrodes 11 and the second electrodes 17 in the touch position. The controller 41 compares signals from the external connecting terminals 35 detected by the detection circuit 43 via the internal connecting terminals 33 and the lead lines 31, thereby detecting the touch position of the contact body in the touch region T1 and the movement of the touch position.

Manufacturing Method

An example method of manufacturing the touch panel TP and the liquid crystal display device DP will be described below with reference to FIG. 9. In this embodiment, an example has been described where the method is single wafer processing, in which the single TFT substrate 1 and the single counter substrate 3 are prepared, and the both substrates 1 and 3 are bonded together to manufacture a single liquid crystal display panel DP. Instead, multiple wafer processing is also applicable, in which a mother panel including a plurality of cell units is prepared, and the mother panel is divided into the cell units to manufacture a plurality of liquid crystal display panels DP at the same time.

Figure 9:
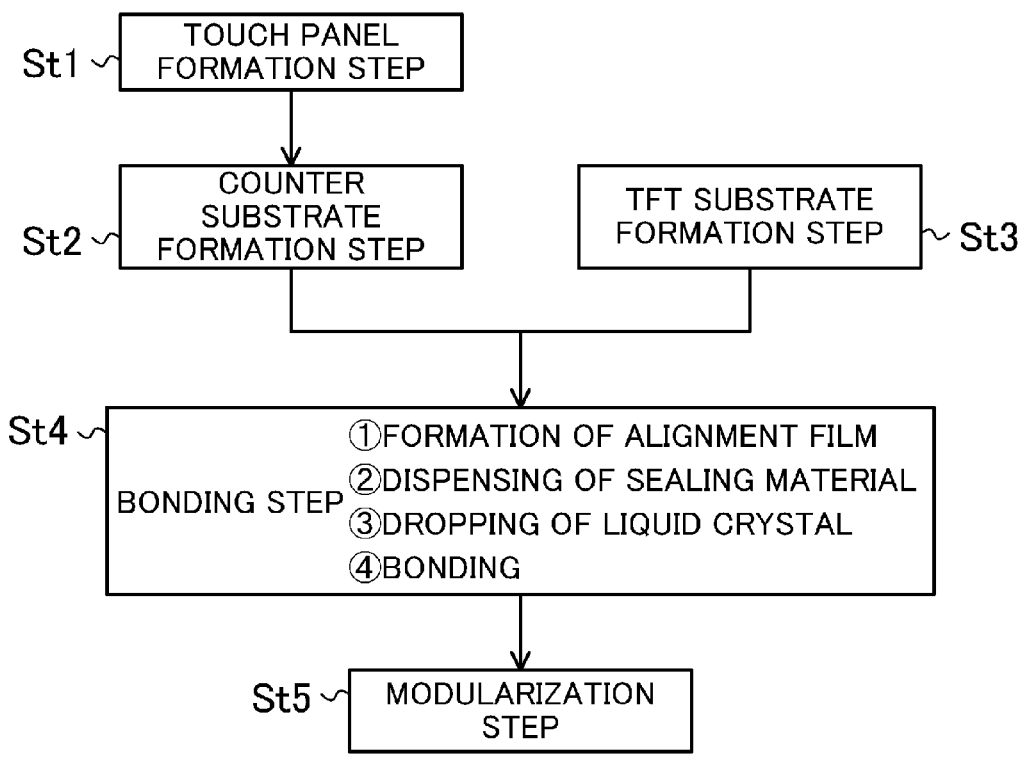
FIG. 9 is a flow chart illustrating a method of manufacturing the liquid crystal display device according to the first embodiment.

FIG. 9 is a flow chart illustrating the method of manufacturing the liquid crystal display device S. The method of manufacturing the liquid crystal display device S includes a touch panel formation step St1, a counter substrate formation step St2, a TFT substrate formation step St3, a bonding step St4, and a modularization step St5.

Touch Panel Formation Step St1

The first electrodes 11, the first connecting portions 13, the second electrodes 17, the lead lines 31, the interlayer insulating film 23, the second connecting portions 19, the internal connecting terminals 33 (each including the first internal interconnect layer 34A and the second internal interconnect layer 34B), the external connecting terminals 35 (each including the first external interconnect layer 36A and the second external interconnect layer 36B), and the protection insulating film 25 are formed on the insulating substrate 10 such as a glass substrate, which has been prepared in advance, by repeating known photolithography to form the touch panel TP.

Counter Substrate Formation Step St2

The black matrix, the color filters, the common electrode, and the photo spacer are formed on the back surface of the substrate 10 of the touch panel TP by a known means of repeating photolithography to form the counter substrate 3 with the touch panel TP.

TFT Substrate Formation Step St3

The gate interconnects, the source interconnects, the TFTs, and the pixel electrodes are formed on an insulating substrate such as a glass substrate, which has been prepared in advance, by a known means of repeating photolithography to form the TFT substrate 1.

Bonding Step St4

Alignment films are formed on the surfaces of the TFT substrate 1 and the counter substrate 3 by printing, and then the surfaces are subjected to rubbing as necessary. Next, the sealing material 5 is dispensed in a frame form by a dispenser etc. A predetermined amount of a liquid crystal material is dropped to the inner region of the sealing material 5. Then, after the TFT substrate 1 and the counter substrate 3 are bonded together by the sealing material 5 and the liquid crystal material under reduced pressure to form the liquid crystal layer 7, the bond formed by the bonding is exposed under atmospheric pressure to apply pressure on the substrate of the bond. In this state, the sealing material 5 is cured by irradiation with an ultraviolet beam or heat treatment to bond the TFT substrate 1 and the counter substrate 3 together, thereby fabricating the liquid crystal display panel DP.

If there is a gap between the TFT substrate 1 and the counter substrate 3 outside the sealing material 5, the sealing material 5 fills the gap and is cured as necessary. After that, polarizing plates are bonded to the both surfaces of the bond, i.e., the outer surface of the TFT substrate 1 and the outer surface of the touch panel TP on the counter substrate 3.

Modularization Step St5

Integrated circuit chips and a circuit board are mounted on the terminal region T3 of the liquid crystal display panel DP with anisotropic conductive films etc., interposed therebetween. The controller 41 is mounted on the terminal region T3 of the touch panel TP. The back light unit BL is attached to the back surface of the liquid crystal display panel DP. As such, the liquid crystal display panel DP, the back light unit BL, and the touch panel TP are modularized.

By the above-described steps, the liquid crystal display device S with the touch panel TP shown in FIG. 1 is manufactured.

The liquid crystal display device S according to the present disclosure is characterized in the structure of the touch panel TP. The touch panel formation step St1 will be described below in detail with reference to FIGS. 10-14. The touch panel formation step St1 includes first to fifth patterning steps. FIGS. 10-14 sequentially show the first to fifth patterning steps of the touch panel formation step St1.

First Patterning Step

First, as shown in FIG. 10A, a transparent conductive film 51 made of, for example, ITO or IZO is formed on the insulating substrate 10 by sputtering. The transparent conductive film 51 is patterned using a first photomask, thereby forming, as shown in FIG. 10B, the first electrodes 11, the first connecting portions 13, the second electrodes 17, the first internal interconnect layers 34A, and the first external interconnect layers 36A to form the first electrode groups 15 and the second electrode groups 21.

Second Patterning Step

For example, a molybdenum-niobium (MoNb) alloy film, an aluminum (Al) film, and a molybdenum-niobium (MoNb) alloy film; a molybdenum nitride (MoN) film, an aluminum (Al) film, and a molybdenum nitride (MoN) film; or a molybdenum (Mo) film, an aluminum (Al) film, and a molybdenum (Mo) film are sequentially formed on the substrate provided with the first electrode groups 15 (i.e., the first electrodes 11), the first connecting portions 13, the second electrode groups 21 (i.e., the second electrodes 17), the first internal interconnect layers 34A, and the first external interconnect layers 36A by sputtering to cover these elements, thereby forming a metal multilayer film 53 shown in FIG. 11A. Then, the metal multilayer film 53 is patterned using a second photomask to form the lead lines 31 to partially overlap and be connected to the first internal interconnect layers 34A and the first external interconnect layers 36A as shown in FIG. 11B.

Third Patterning Step

An insulating film 54 shown in FIG. 12A and made of, for example, silicon nitride (SiN) is formed on the substrate provided with the lead lines 31 by chemical vapor deposition (hereinafter referred to as CVD) to cover the first electrode groups 15 (i.e., the first electrodes 11), the first connecting portions 13, the second electrode groups 21 (i.e., the second electrodes 17), the first internal interconnect layers 34A, the first external interconnect layers 36A, and the lead lines 31. Next, the insulating film 54 is patterned using a third photomask to form the contact holes 23a, 23b, 23c, and 23d in the insulating film 54 as shown in FIG. 12B so that the corners of the second electrodes 17, the first internal interconnect layers 34A, and the lead lines 31 are partially exposed, and the portion of the insulating film in the terminal region T3 is removed to expose the first external interconnect layers 36A from the insulating film 54. As such, the interlayer insulating film 23 is formed from the insulating film 54.

Fourth Patterning Step

As shown in FIG. 13A, a transparent conductive film 55 made of, for example, ITO or IZO is formed on the substrate provided with the interlayer insulating film 23 by sputtering. The transparent conductive film 55 is patterned using a fourth photomask to form, as shown in FIG. 13B, the second connecting portions 19 to be connected to the second electrodes 17 via the contact holes 23a, the second internal interconnect layers 34B to be connected to the first internal interconnect layers 34A and the lead lines 31 via the contact holes 23b and 23c, and the second external interconnect layers 36B to be connected to the lead lines 31 via the contact holes 23d and to cover the first external interconnect layers 36A in the terminal region T3, thereby forming the internal connecting terminals 33 and the external connecting terminals 35.

Fifth Patterning Step

A first insulating film 57 made of, for example, silicon nitride (SiN) is formed on the substrate provided with the second connecting portions 19, the second internal interconnect layers 34B, and the second external interconnect layers 36B by CVD to cover these elements. Then, as shown in FIG. 14A, a second insulating film 58 made of an acrylic-based organic insulating material is formed on the first insulating film 57 by spin coating or slit coating to form a multilayer insulating film 59. As shown in FIG. 14B, the protection insulating film 25 is patterned using a fifth photomask to remove the portion of the multilayer insulating film in the terminal region T3 to expose the external connecting terminals 35 from the multilayer insulating film 59, thereby forming the protection insulating film 25 from the multilayer insulating film 59.

While in this fifth patterning step, the first protection insulating film 27 and the second protection insulating film 29 are patterned together, the second protection insulating film 29 may be formed by photolithography using a fifth photomask and then patterned by etching the first protection insulating film 27 using the second protection insulating film 29 as a mask.

As described above, the touch panel TP is formed.

Advantages of First Embodiment

In this first embodiment, each internal connecting terminal 33 has the parallel connection structure of the first internal interconnect layer 34A and the second internal interconnect layer 34B, which are connected in parallel to the lead line 31, thereby greatly reducing the electrical resistance of the internal connecting terminal 33 as compared to the case where the internal connecting terminal 33 is a single layer made of transparent conductive oxide such as ITO and IZO and connected in series to the lead line 31.

Each external connecting terminal 35 has the parallel connection structure of the first external interconnect layer 36A and the second external interconnect layer 36B, which are connected in parallel to the lead line 31, thereby greatly reducing the electrical resistance of the external connecting terminal 35 as compared to the case where the external connecting terminal 35 is a single layer made of transparent conductive oxide such as ITO and IZO and connected in series to the lead line 31.

Since the first internal interconnect layer 34A and the first external interconnect layer 36A are formed of the same film as the first electrodes 11, the second electrodes 17, etc., and the second internal interconnect layer 34B and the second external interconnect layer 36B are formed of the same film as the second connecting portions 19; there is no need to increase the manufacturing steps so that each internal connecting terminal 33 and each external connecting terminal 35 have a parallel connection structure.

This reduces the electrical resistance of the internal connecting terminals 33 and the external connecting terminals 35 without increasing the manufacturing costs. This prevents poor conduction between the controller 41 and the first and second electrode groups 15 and 21, thereby providing an excellent function of touch position detection. As a result, the liquid crystal display device S, which accurately inputs information by performing various types of operation using a contact body such as a finger or a pen, is provided at low costs.

First Variation of First Embodiment

Figure 15:
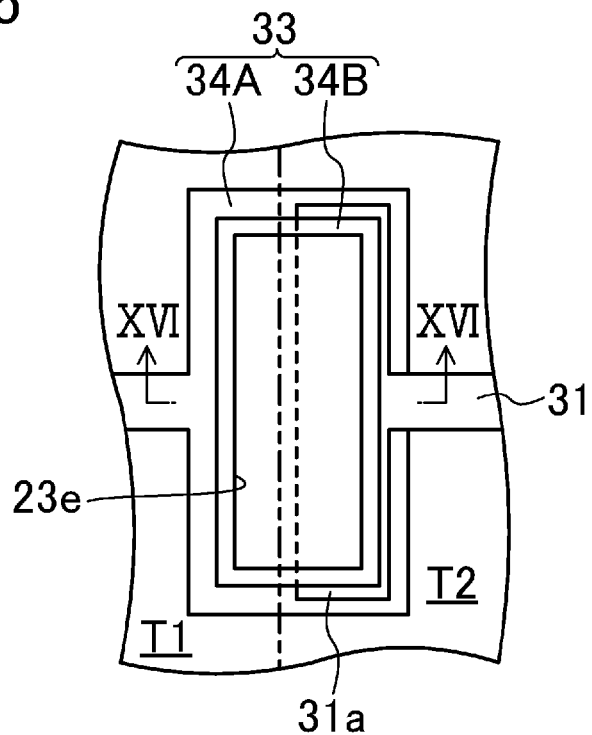
FIG. 15 is an enlarged top view illustrating the connection between an internal connecting terminal and a lead line according to a first variation of the first embodiment.
Figure 16:
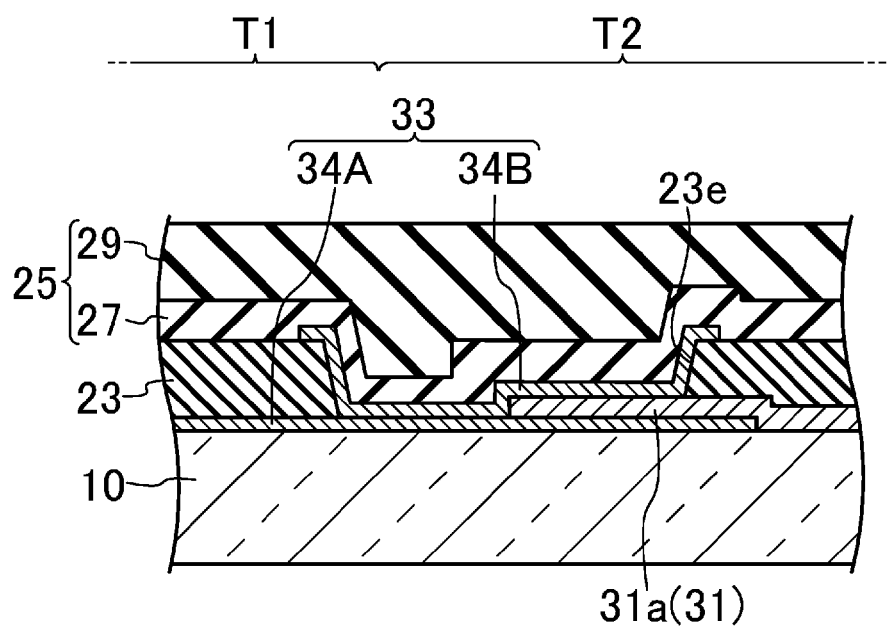
FIG. 16 is a cross-sectional view illustrating the cross-sectional structure taken along the line XVI-XVI of FIG. 15.

FIG. 15 is an enlarged top view illustrating the connection between each internal connecting terminal 33 and a lead line 31 in a touch panel TP according to a first variation. FIG. 16 is a cross-sectional view illustrating the cross-sectional structure taken along the line XVI-XVI of FIG. 15.

In the above-described first embodiment, the second internal interconnect layer 34B of each internal connecting terminal 33 is connected to the corresponding first internal interconnect layer 34A and the lead line 31 via the different contact holes 23b and 23c formed in the interlayer insulating film 23, respectively. In this variation, as shown in FIGS. 15 and 16, a second internal interconnect layer 34B is connected to a first internal interconnect layer 34A and the lead line 31 via a single opening 23e.

Specifically, the opening 23e, which is open from the portion overlapping a lead base end 31a of the lead line 31 to a portion located in the touch region T1 outside the lead line 31, is formed the interlayer insulating film 23; and the second internal interconnect layer 34B is formed to cover the entire inner surface of the opening 23e. This second internal interconnect layer 34B is connected to the lead line 31 at the portion overlapping the lead base end 31a of the lead line 31 inside the opening 23e, and connected to the first internal interconnect layer 34A at a portion outside the lead line 31.

Advantages of First Variation of First Embodiment

In this first variation, as compared to the first embodiment where each second internal interconnect layer 34B is connected to the first internal interconnect layer 34A and the lead line 31 via the different contact holes 23b and 23c, respectively, the contact area between the lead line 31 and the first and second internal interconnect layers 34A and 34B increases. This reduces the contact resistance between the lead line 31 and the first and second internal interconnect layers 34A and 34B. As a result, poor conduction between the internal connecting terminal 33 and the lead line 31 is greatly reduced.

Second Variation of First Embodiment

Figure 17:
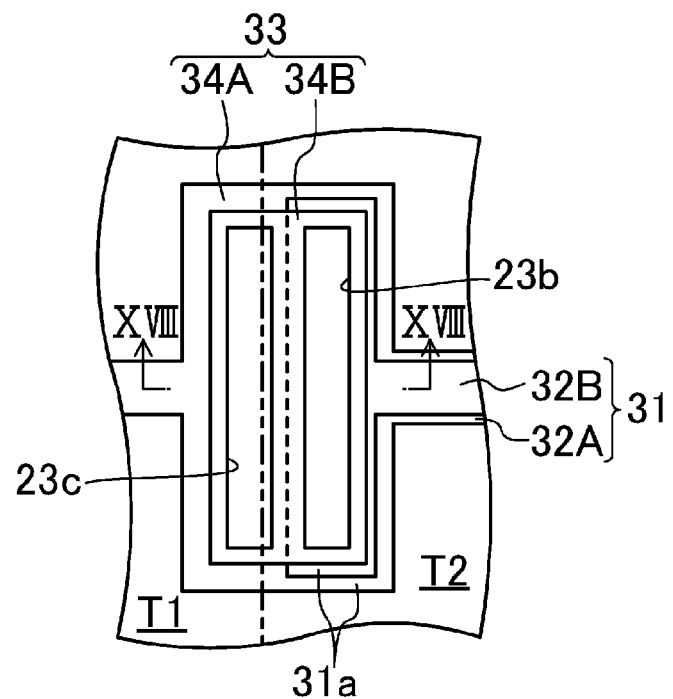
FIG. 17 is an enlarged top view illustrating the connection between an internal connecting terminal and a lead line according to a second variation of the first embodiment.
Figure 18:
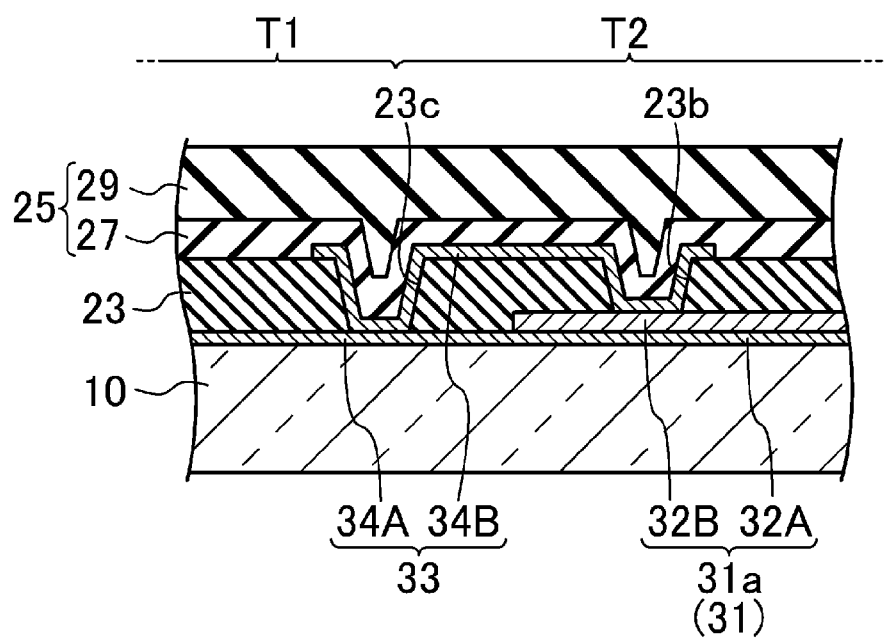
FIG. 18 is a cross-sectional view illustrating the cross-sectional structure taken along the line XVIII-XVIII of FIG. 17.
Figure 19:
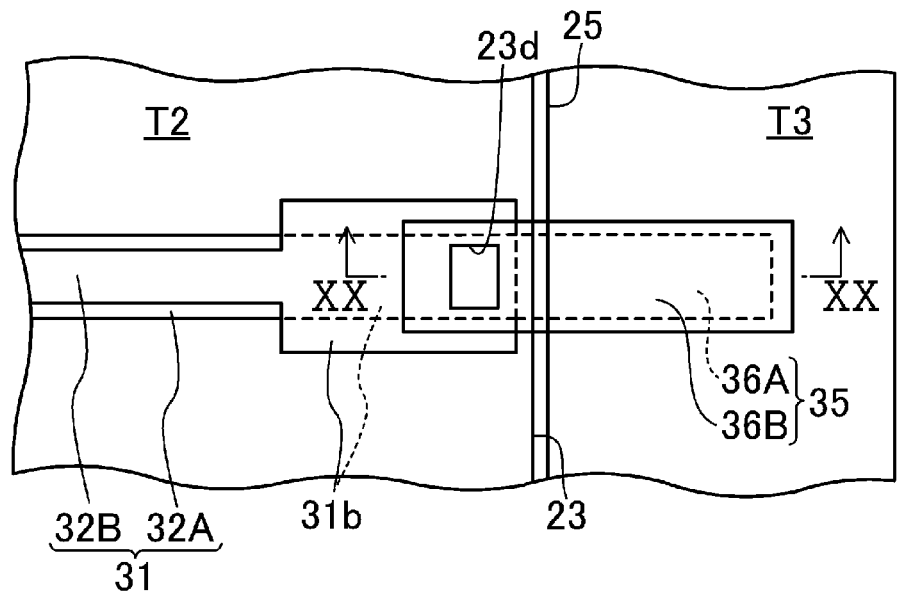
FIG. 19 is an enlarged top view illustrating the connection between an external connecting terminal and a lead line according to the second variation of the first embodiment.
Figure 20:
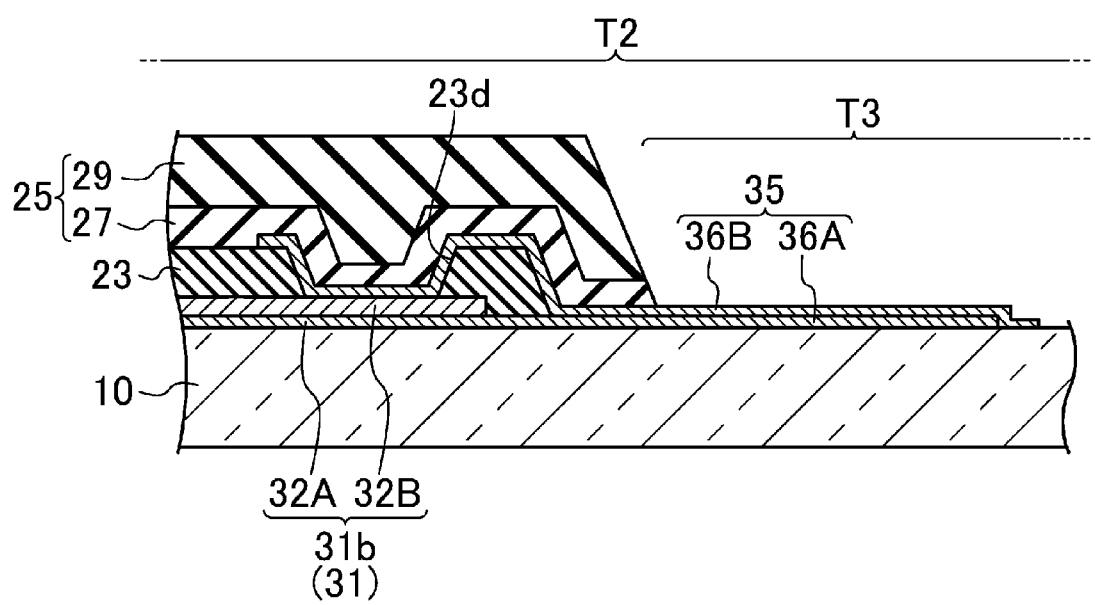
FIG. 20 is a cross-sectional view illustrating the cross-sectional structure taken along the line XX-XX of FIG. 19.

FIG. 17 is an enlarged top view illustrating the connection between each internal connecting terminal 33 and a lead line 31 in a touch panel TP according to a second variation. FIG. 18 is a cross-sectional view illustrating the cross-sectional structure taken along the line XVIII-XVIII of FIG. 17. FIG. 19 is an enlarged top view illustrating the connection between each external connecting terminal 35 and the lead line 31 in the touch panel TP according to this second variation. FIG. 20 is a cross-sectional view illustrating the cross-sectional structure taken along the line XX-XX of FIG. 19.

In the above-described first embodiment, each lead line 31 is formed of only the plurality of metal layers patterned together. As shown in FIGS. 17-20, in this variation, the lead line 31 is formed by stacking a lower interconnect layer 32A formed of the same film as the first electrode groups 15 (i.e., the first electrodes 11), the first connecting portions 13, and the second electrode groups 21 (i.e., the second electrodes 17), and an upper interconnect layer 32B formed of a plurality of metal layers (e.g., MoNb/Al/MoNb, MoN/Al/MoN, Mo/Al/Mo) similar to those of the lead lines 31 in the first embodiment.

The lower interconnect layer 32A is integrally formed with the first internal interconnect layer 34A of each internal connecting terminal 33 and a first external interconnect layer 36A of each external connecting terminal 35 to connect the first internal interconnect layer 34A and the first external interconnect layer 36A together. In this variation, the lower interconnect layer 32A is the first interconnect layer of the present disclosure, and the upper interconnect layer 32B is the second interconnect layer of the present disclosure.

Such a touch panel TP is manufactured by forming the lower interconnect layer 32A from a transparent conductive film 51 together with the first electrodes 11 and the second electrodes 17 in the first patterning step of the first embodiment, and by forming the upper interconnect layer 32B in the second patterning step.

Advantages of Second Variation of First Embodiment

In this second variation, the lead line 31 has the multilayer of the lower interconnect layer 32A and the upper interconnect layer 32B. Thus, as compared to the first embodiment where each lead line 31 is a layer made of only metal materials similar to those of the upper interconnect layer 32B, the lead line 31 is thick, since the multilayer has one layer (i.e., the lower interconnect layer 32A) more to form the lead line 31. This reduces the resistance of the lead line 31. As a result, poor conduction between the controller 41 and the first and second electrode groups 15 and 21 is more reliably prevented.

Formed of the same film as the first electrodes 11 and the second electrodes 17, the lower interconnect layer 32A can be formed together with the first electrodes 11 and the second electrodes 17 not to increase the manufacturing steps.

Second Embodiment of Invention

Figure 21:
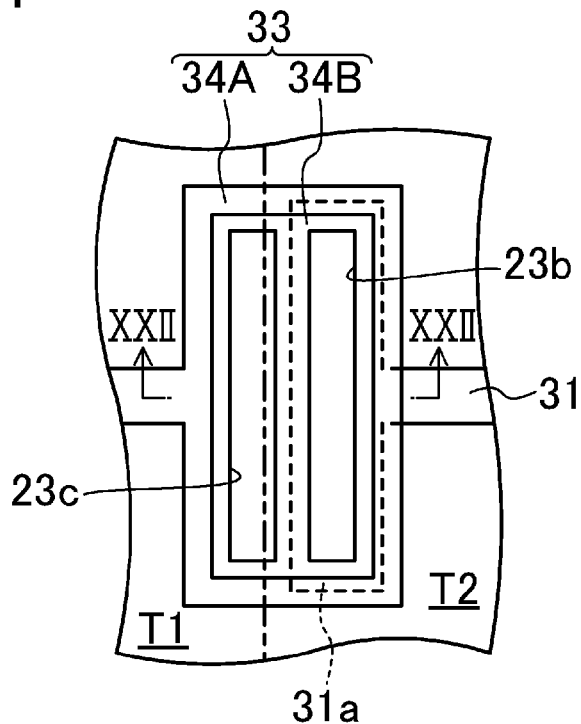
FIG. 21 is an enlarged top view illustrating the connection between an internal connecting terminal and a lead line according to a second embodiment.
Figure 22:
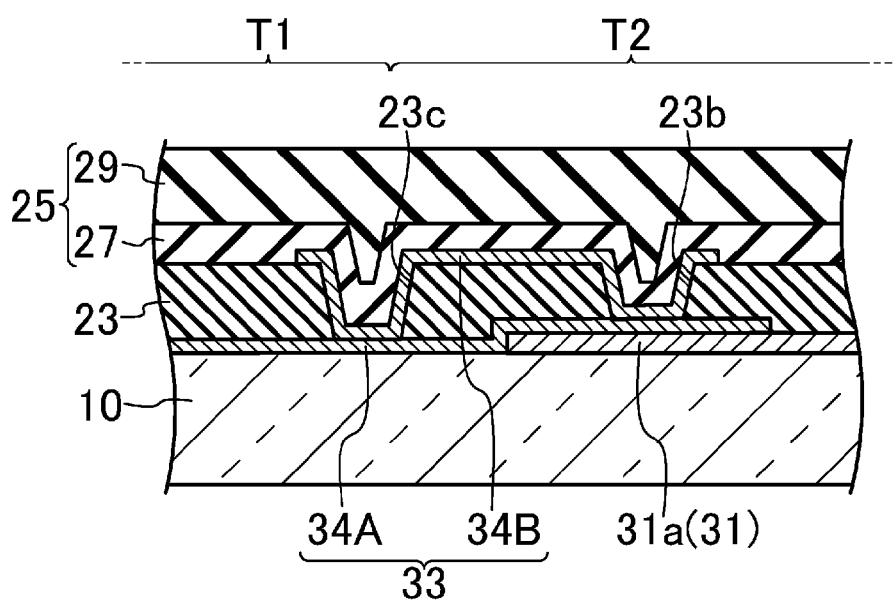
FIG. 22 is a cross-sectional view illustrating the cross-sectional structure taken along the line XXII-XXII of FIG. 21.
Figure 23:
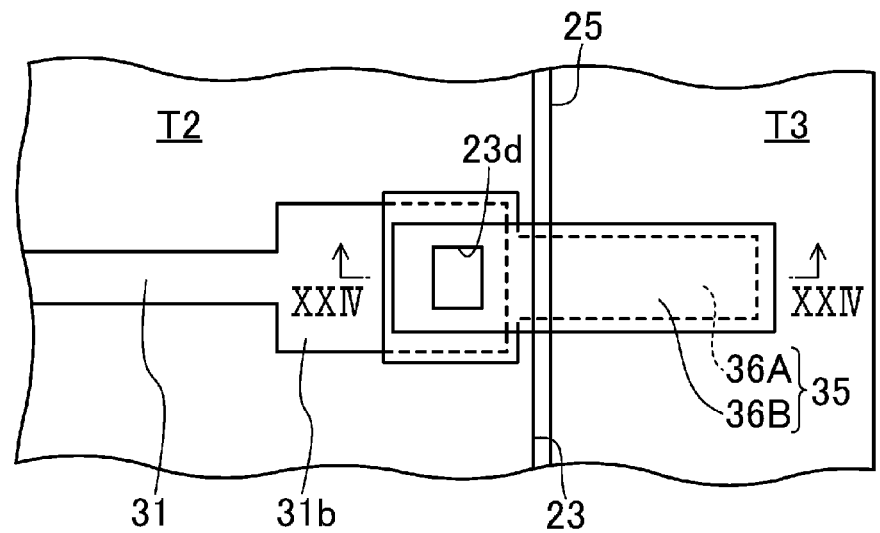
FIG. 23 is an enlarged top view illustrating the connection between an external connecting terminal and a lead line according to the second embodiment.
Figure 24:
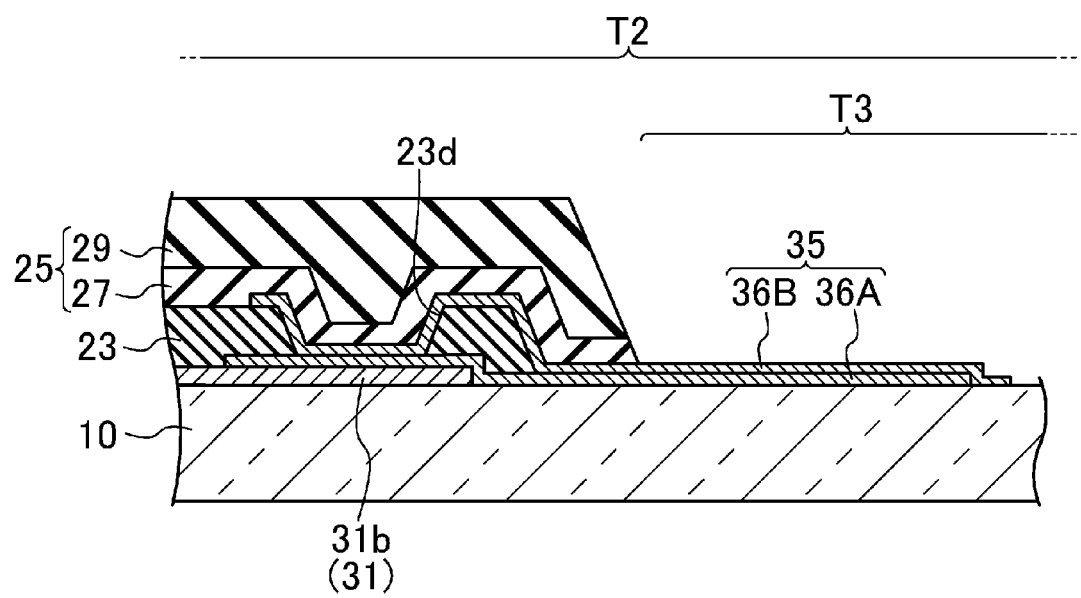
FIG. 24 is a cross-sectional view illustrating the cross-sectional structure taken along the line XXIV-XXIV of FIG. 23.

FIG. 21 is an enlarged top view illustrating the connection between each internal connecting terminal 33 and a lead line 31 in a touch panel TP according to a second embodiment. FIG. 22 is a cross-sectional view illustrating the cross-sectional structure taken along the line XXII-XXII of FIG. 21. FIG. 23 is an enlarged top view illustrating the connection between each external connecting terminal 35 and the lead line 31 of the touch panel TP according to the second embodiment. FIG. 24 is a cross-sectional view illustrating the cross-sectional structure taken along the line XXIV-XXIV of FIG. 23.

In this embodiment, the structure of the touch panel TP partially differs from that in the above-described first embodiment, and the other elements are similar to those in the first embodiment. Only the portions of the touch panel having the different structure will be thus described. In the following embodiments, the same reference characters as those shown in FIGS. 1-20 are used to represent equivalent elements, and the detailed explanation thereof is to be referred to the first embodiment and will be omitted.

In the above-described first embodiment, the first internal interconnect layer 34A of each internal connecting terminal 33 and the first external interconnect layer 36A of each external connecting terminal 35 are provided under and in connection to one of the lead lines 31. In this embodiment, a first internal interconnect layer 34A and a first external interconnect layer 36A are provided on and in connection to one of lead line 31.

As shown in FIGS. 21 and 22, the first internal interconnect layer 34A is formed to cover a lead base end 31a of the lead line 31. On the other hand, a second internal interconnect layer 34B is connected to the first internal interconnect layer 34A at the portion overlapping the lead base end 31a of the lead line 31 via a contact hole 23c formed in an interlayer insulating film 23, and electrically connected to the lead line 31 via the first internal interconnect layer 34A. Similar to the first embodiment, the second internal interconnect layer 34B is connected to the first internal interconnect layer 34A at a portion located outside the lead line 31 and closer to the touch region T1 (in the left of FIG. 5) than the lead line 31 via the contact hole 23c formed in the interlayer insulating film 23.

As shown in FIGS. 23 and 24, the first external interconnect layer 36A is formed to cover a lead top 31b of the lead line 31 at the side of a terminal region T3. On the other hand, a second external interconnect layer 36B is connected to the first external interconnect layer 36A at the portion overlapping the lead top 31b of the lead line 31 via a contact hole 23d formed in an interlayer insulating film 23, and electrically connected to the lead line 31 via the first external interconnect layer 36A. Similar to the first embodiment, the first external interconnect layer 36A and the second external interconnect layer 36B extend to the terminal region T3 and are stacked one on the other.

Manufacturing Method

A method of manufacturing the touch panel TP according to this embodiment will be described below with reference to FIGS. 25-28. Similar to the first embodiment, a touch panel formation step St1 of forming the touch panel TP includes first to fifth patterning steps. FIGS. 25-28 sequentially show the first to fourth patterning steps. In FIGS. 25-28, the portions respectively correspond to FIGS. 4, 22, and 24 from the left of the figures. The fifth patterning step is similar to the above-described embodiment and the explanation thereof will be thus omitted.

First Patterning Step

For example, a molybdenum-niobium (MoNb) alloy film, an aluminum (Al) film, and a molybdenum-niobium (MoNb) alloy film; a molybdenum nitride (MoN) film, an aluminum (Al) film, and a molybdenum nitride (MoN) film; or a molybdenum (Mo) film, an aluminum (Al) film, and a molybdenum (Mo) film are sequentially formed by sputtering on an insulating substrate 10, which has been prepared in advance, thereby forming a metal multilayer film 53 shown in FIG. 25A. Then, the metal multilayer film 53 is patterned using a first photomask to form the lead lines 31 as shown in FIG. 25B.

Second Patterning Step

A transparent conductive film 51 shown in FIG. 26A and made of, for example, ITO or IZO is formed by sputtering on the insulating substrate 10 provided with the lead lines 31 to cover the insulating substrate 10. Then, the transparent conductive film 51 is patterned using the first photomask, thereby forming first electrodes 11, first connecting portions 13, and second electrodes 17 to form first electrode groups 15 and second electrode groups 21, and forming the first internal interconnect layers 34A and the first external interconnect layers 36A to partially overlap and to be connected to the lead lines 31 as shown in FIG. 26B.

Third Patterning Step

An insulating film 54 shown in FIG. 37A and made of, for example, silicon nitride (SiN) is formed by CVD on the substrate provided with the first electrode groups 15 (i.e., the first electrodes 11), the first connecting portions 13, the second electrode groups 21 (i.e., the second electrodes 17), the first internal interconnect layers 34A, and the first external interconnect layers 36A to cover these elements and the lead lines 31. Next, the insulating film 54 is patterned using a third photomask to form contact holes 23a, 23b, 23c, and 23d in the insulating film 54 as shown in FIG. 27B so that the corners of the second electrodes 17 are exposed, the first internal interconnect layers 34A are partially exposed at the portions overlapping the lead base ends 31a of the lead lines 31 and at outer portions, and the first external interconnect layers 36A are partially exposed at the portions overlapping the lead tops 31b of the lead lines 31. At the same time, the portion of the insulating film in the terminal region T3 is removed to expose the first interconnect layers 36A from the insulating film 54. As such, the interlayer insulating film 23 is formed from the insulating film 54.

Fourth Patterning Step

As shown in FIG. 28A, a transparent conductive film 55 made of, for example, ITO or IZO is formed by sputtering on the substrate provided with the interlayer insulating film 23. The transparent conductive film 55 is patterned using a fourth photomask to form, as shown in FIG. 28B, the second connecting portions 19 to be connected to the second electrodes 17 via the contact holes 23a, the and internal interconnect layers 34B to be connected to the first internal interconnect layers 34A via the contact holes 23b and 23c, the second external interconnect layers 36B to be connected to the first external interconnect layers 36A via the contact holes 23d and to cover the first external interconnect layers 36A in the terminal region T3, thereby forming the internal connecting terminals 33 and the external connecting terminals 35.

After that, a fifth patterning step similar to that in the first embodiment is performed to manufacture the touch panel TP according to this embodiment.

Advantages of Second Embodiment

In this second embodiment, each internal connecting terminal 33 and each external connecting terminal 35 have the parallel connection structure of the two layers (i.e., the first internal interconnect layer 34A and the second internal interconnect layer 34B, or the first external interconnect layer 36A and the second external interconnect layer 36B), which are connected in parallel to the lead line 31, thereby reducing the electrical resistance of the internal connecting terminal 33 and the external connecting terminal 35 to provide advantages similar to those of the first embodiment.

First Variation of Second Embodiment

Figure 29:
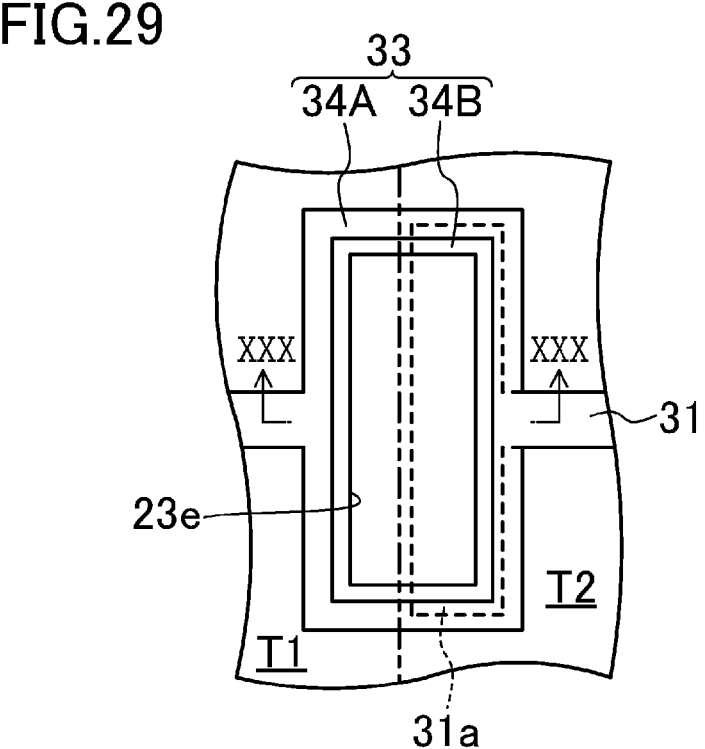
FIG. 29 is an enlarged top view illustrating the connection between an internal connecting terminal and a lead line according to a first variation of the second embodiment.
Figure 30:
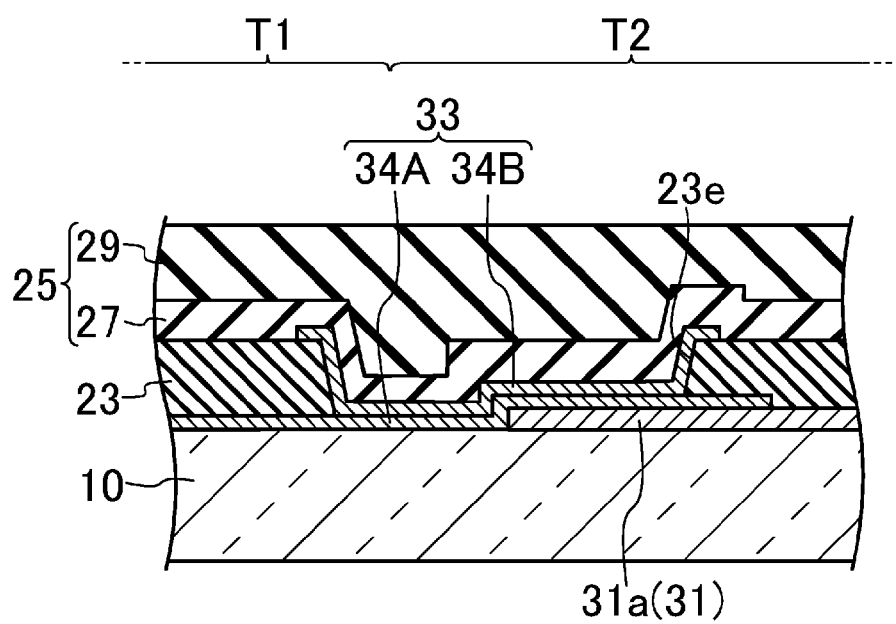
FIG. 30 is a cross-sectional view illustrating the cross-sectional structure taken along the line XXX-XXX of FIG. 29.

FIG. 29 is an enlarged top view illustrating the connection between each internal connecting terminal 33 and a lead line 31 in a touch panel TP according to a first variation. FIG. 30 is a cross-sectional view illustrating the cross-sectional structure taken along the line XXX-XXX of FIG. 29.

The above-described second embodiment shows that the second internal interconnect layer 34B of each internal connecting terminal 33 is electrically connected to the first internal interconnect layer 34A and the lead line 31 via the different contact holes 23b and 23c formed in the interlayer insulating film 23, respectively. In this variation, as shown in FIGS. 29 and 30, a second internal interconnect layer 34B is electrically connected to a first internal interconnect layer 34A and the lead line 31 via a single opening 23e.

Specifically, the opening 23e, which is open from the portion overlapping a lead base end 31a of the lead line 31 to a portion located in a touch region T1 outside the lead line 31, is formed the interlayer insulating film 23; and the second internal interconnect layer 34B is formed to cover the entire inner surface of the opening 23e. This second internal interconnect layer 34B is electrically connected to the lead line 31 via the first internal interconnect layer 34A at the portion overlapping the lead base end 31a of the lead line 31 inside the opening 23e, and connected to the first internal interconnect layer 34A at a portion outside the lead line 31.

Advantages of First Variation of Second Embodiment

In this first variation, as compared to the first embodiment where each second internal interconnect layer 34B is connected to the lead line 31 and the first internal interconnect layer 34A via the different contact holes 23b and 23c, respectively, the contact area between the lead line 31 and the first and second internal interconnect layers 34A and 34B increases. This reduces the contact resistance between the lead line 31 and the first and second internal interconnect layers 34A and 34B. As a result, poor conduction between the internal connecting terminal 33 and the lead line 31 is greatly prevented.

Second Variation of Second Embodiment

Figure 31:
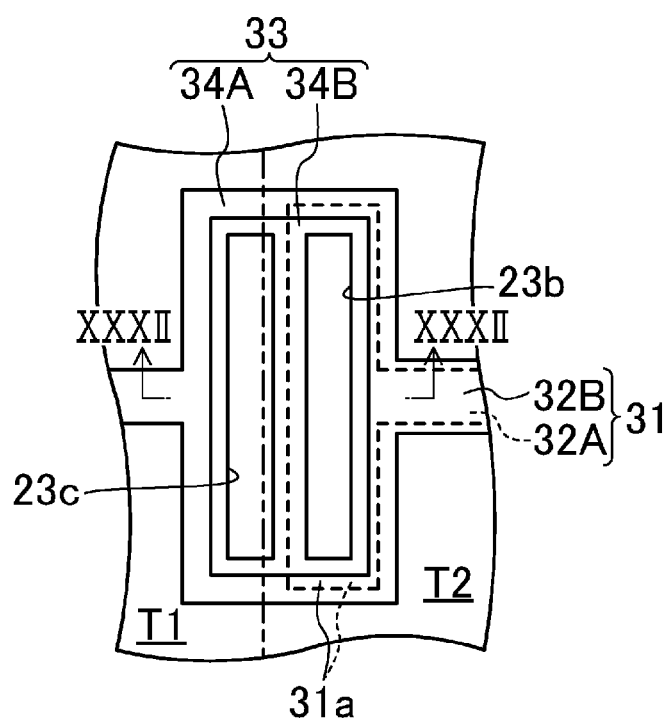
FIG. 31 is an enlarged top view illustrating the connection between an internal connecting terminal and a lead line according to a second variation of the second embodiment.
Figure 32:
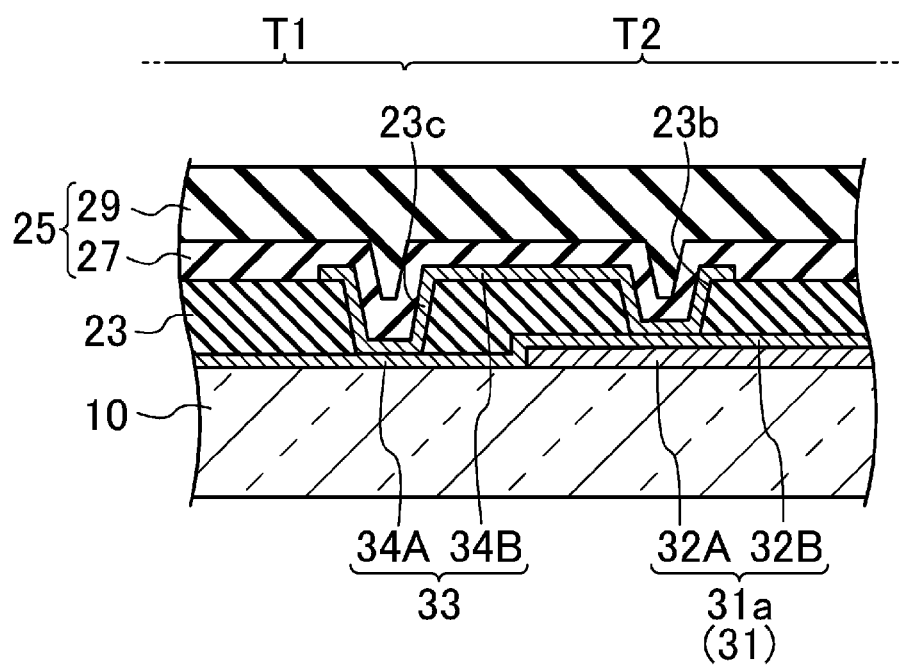
FIG. 32 is a cross-sectional view illustrating the cross-sectional structure taken along the line XXXII-XXXII of FIG. 31.
Figure 33:
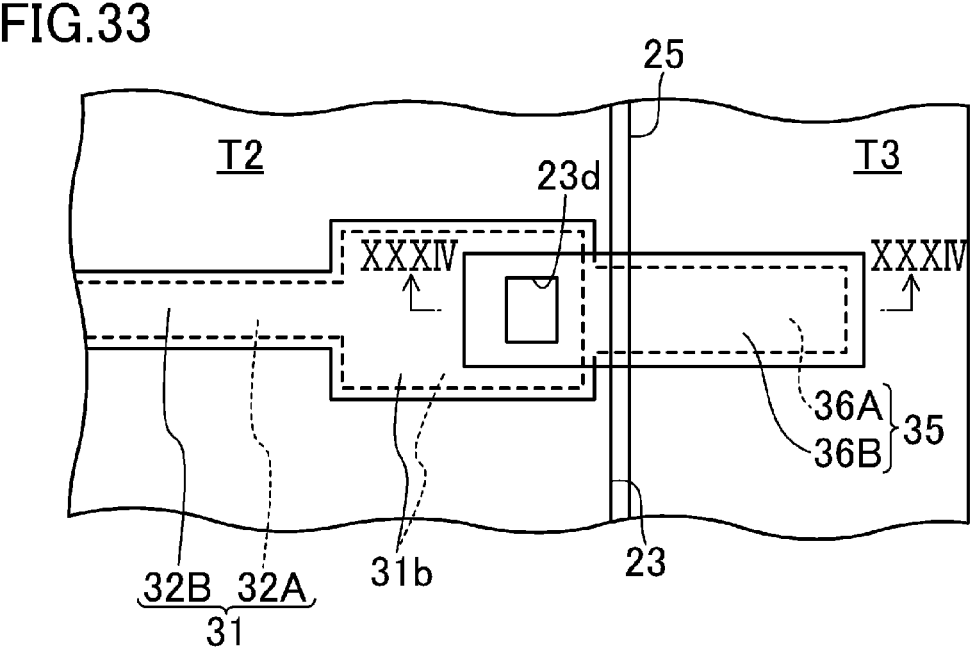
FIG. 33 is an enlarged top view illustrating the connection between an external connecting terminal and a lead line according to the second variation of the second embodiment.
Figure 34:
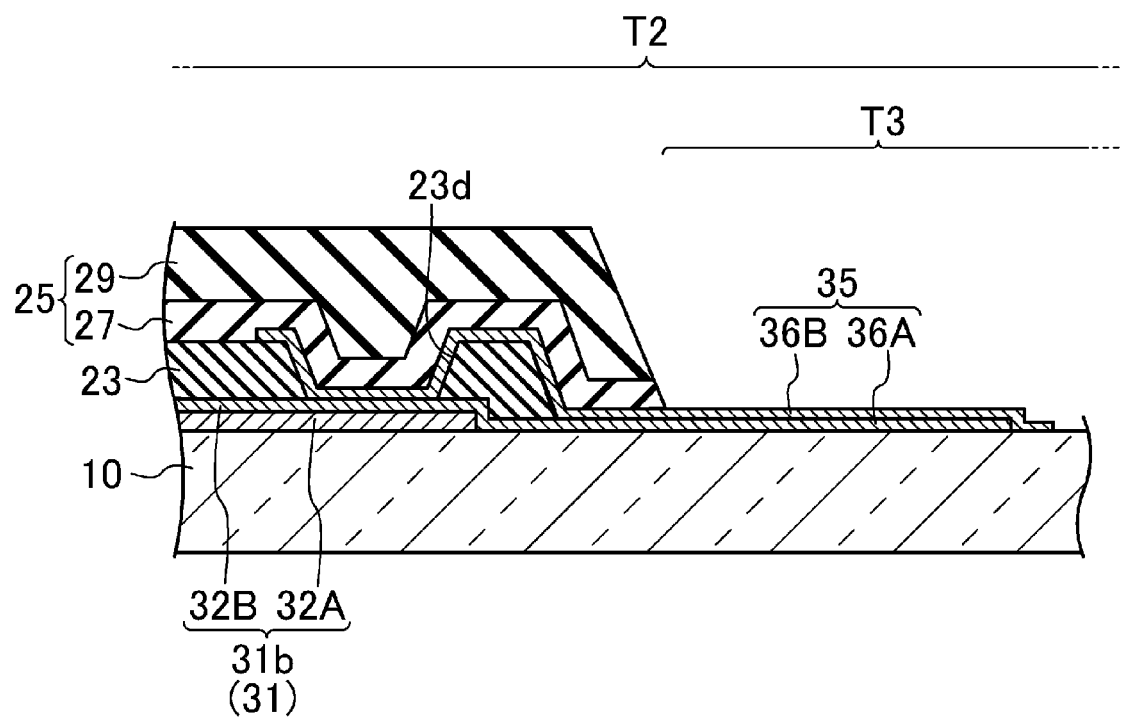
FIG. 34 is a cross-sectional view illustrating the cross-sectional structure taken along the line XXXIV-XXXIV of FIG. 33.

FIG. 31 is an enlarged top view illustrating the connection between each internal connecting terminal 33 and a lead line 31 in a touch panel TP according to a second variation. FIG. 32 is a cross-sectional view illustrating the cross-sectional structure taken along the line XXXII-XXXII of FIG. 31. FIG. 33 is an enlarged top view illustrating the connection between each external connecting terminal 35 and a lead line 31 in the touch panel TP according to this second variation. FIG. 34 is a cross-sectional view illustrating the cross-sectional structure taken along the line XXXIV-XXXIV of FIG. 33.

In the above-described second embodiment, similar to the first embodiment, each lead line 31 is formed of only the plurality of metal layers patterned together. In this variation, as shown in FIGS. 31-34, the lead line 31 is formed by stacking a lower interconnect layer 32A formed of a plurality of metal layers (e.g., MoNb/Al/MoNb, MoN/Al/MoN, Mo/Al/Mo) similar to those of the lead lines 31 in the first embodiment, and an upper interconnect layer 32B formed of the same film as first electrode groups 15 (i.e., first electrodes 11), first connecting portions 13, and second electrode groups 21 (i.e., second electrodes 17).

The upper interconnect layer 32B is integrally formed with the first internal interconnect layer 34A of each internal connecting terminal 33 and the first external interconnect layer 36A of each external connecting terminal 35 to connect the first internal interconnect layer 34A and the first external interconnect layer 36A together. In this variation, the lower interconnect layer 32A is the second interconnect layer of the present disclosure, and the upper interconnect layer 32B is the first interconnect layer of the present disclosure.

Such a touch panel TP is manufactured by forming the lower interconnect layer 32A in the first patterning step of the first embodiment, and by forming the upper interconnect layer 32B from a transparent conductive film 51 together with the first electrodes 11 and the second electrodes 17 in the second patterning step.

Advantages of Second Variation of Second Embodiment

In this second variation, the lead line 31 has the multilayer of the lower interconnect layer 32A and the upper interconnect layer 32B. Thus, as compared to the second embodiment where each lead line 31 is a layer made of only metal materials similar to those of the lower interconnect layer 32A, the lead line 31 is thick, since the multilayer has one layer (i.e., the upper interconnect layer 32B) more to form the lead line 31. This reduces the resistance of the lead line 31. As a result, poor conduction between a controller 41 and the first and second electrode groups 15 and 21 is more reliably prevented.

Formed of the same film as the first electrodes 11 and the second electrodes 17, the upper interconnect layer 32B can be formed together with the first electrodes 11 and the second electrodes 17 not to increase the manufacturing steps.

Other Embodiments

The following structures and manufacturing methods are applicable to the first and second embodiments, and the variations.

Location of Lead Line 31

FIGS. 35-38 illustrate the connection between each lead line 31 and connecting terminals 33 and 35 connected to the both ends of the lead line 31 in touch panels TP according to other embodiments.

Figure 35:
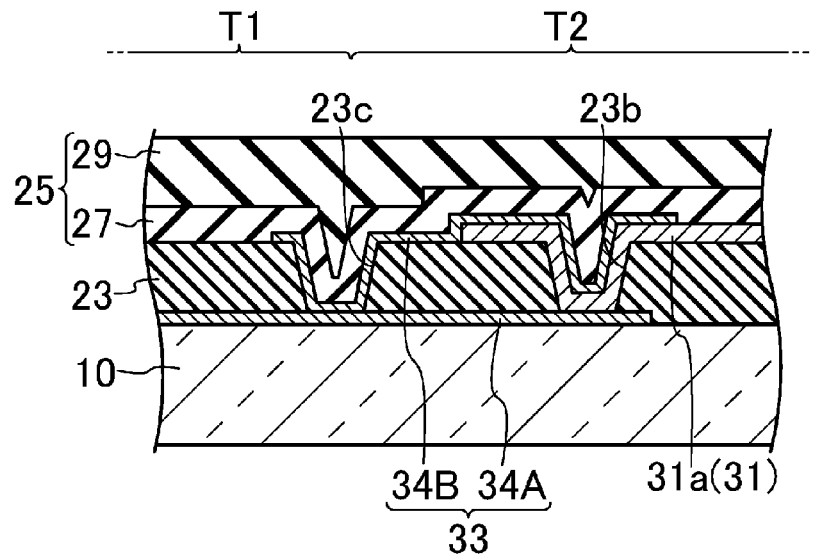
FIG. 35 is a cross-sectional view illustrating a first aspect of the connection between an internal connecting terminal and a lead line according to another embodiment.
Figure 36:
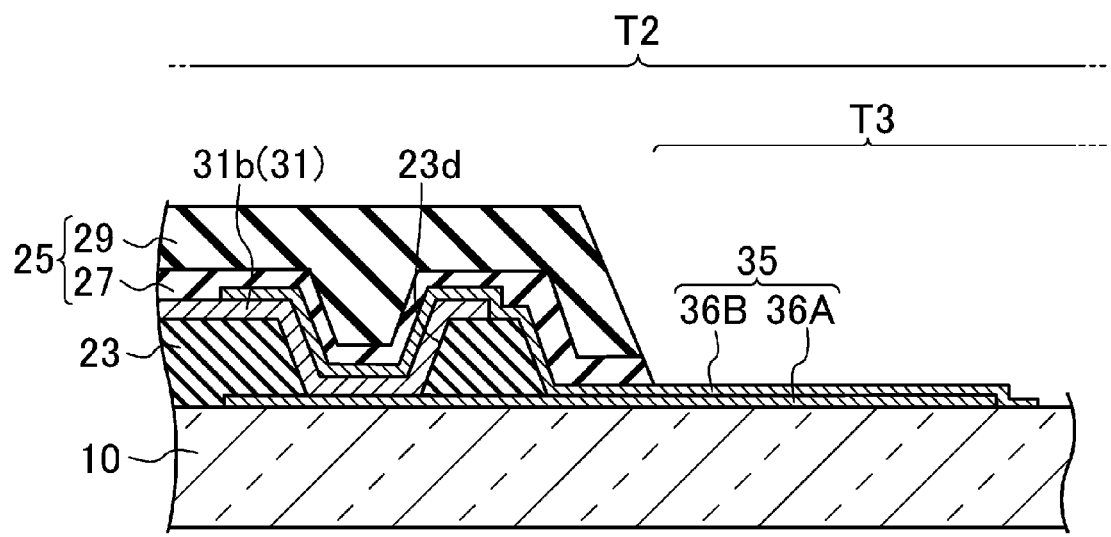
FIG. 36 is a cross-sectional view illustrating a first aspect of the connection between an external connecting terminal and a lead line according to the other embodiment.
Figure 37:
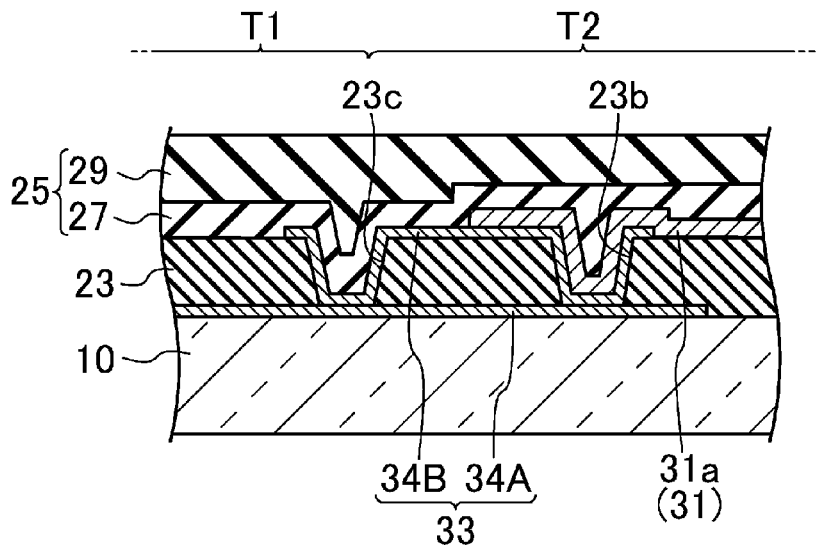
FIG. 37 is a cross-sectional view illustrating a second aspect of the connection between an internal connecting terminal and a lead line according to the other embodiment.
Figure 38:
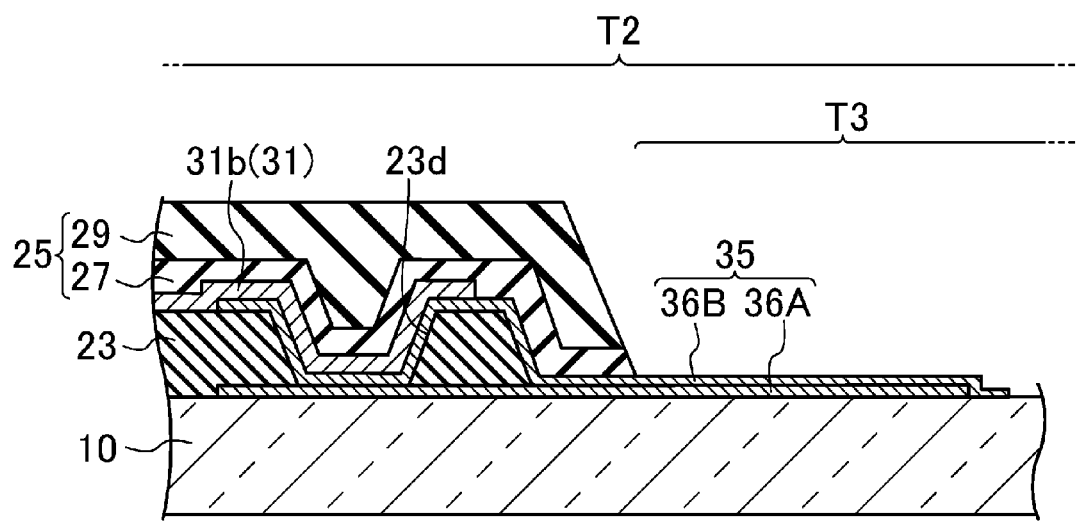
FIG. 38 is a cross-sectional view illustrating a second aspect of the connection between an external connecting terminal and a lead line according to the other embodiment.

FIG. 35 is a cross-sectional view illustrating a first aspect of the connection between each internal connecting terminal 33 and a lead line 31. FIG. 36 is a cross-sectional view illustrating a first aspect of the connection between each external connecting terminal 35 and a lead line 31. FIG. 37 is a cross-sectional view illustrating a second aspect of the connection between each internal connecting terminal 33 and a lead line 31. FIG. 38 is a cross-sectional view illustrating a second aspect of the connection between each external connecting terminal 35 and a lead line 31.

While, in the above-described first and second embodiments and the variations, an example has been described where each lead line 31 is provided under the interlayer insulating film 23, the present disclosure is not limited thereto. For example, as shown in FIGS. 35 and 36, each lead line 31 may be provided on an interlayer insulating film 23 and connected to a first internal interconnect layer 34A and a first external interconnect layer 36A via contact holes 23b and 23b formed in an interlayer insulating film 23. A second internal interconnect layer 34B and a second external interconnect layer 36B may be provided on the lead line 31 and connected to the upper surface of the lead line 31.

Alternatively, as shown in FIGS. 37 and 38, a lead line 31 may be provided on an interlayer insulating film 23. A second internal interconnect layer 34B and a second external interconnect layer 36B may be provided under the lead line 31 and connected to the lower surface of the lead line 31. A first internal interconnect layer 34A and a first external interconnect layer 36A may be electrically connected to the lead line 31 via the second internal interconnect layer 34B and the second external interconnect layer 36B, respectively.

In the above-described structures as well, each internal connecting terminal 33 and each external connecting terminal 35 have the parallel connection structure of the two layers (i.e., the first internal interconnect layer 34A and the second internal interconnect layer 34B, or the first external interconnect layer 36A and the second external interconnect layer 36B), which are connected in parallel to the lead line 31, thereby reducing the electrical resistance of the internal connecting terminal 33 and the external connecting terminal 35 without increasing the manufacturing costs to provide an excellent function of touch position detection. Location of First Electrode Groups 15, First Connecting Portions 13, Second Electrode Groups 21, and Second Connecting Portions 19

Figure 39:
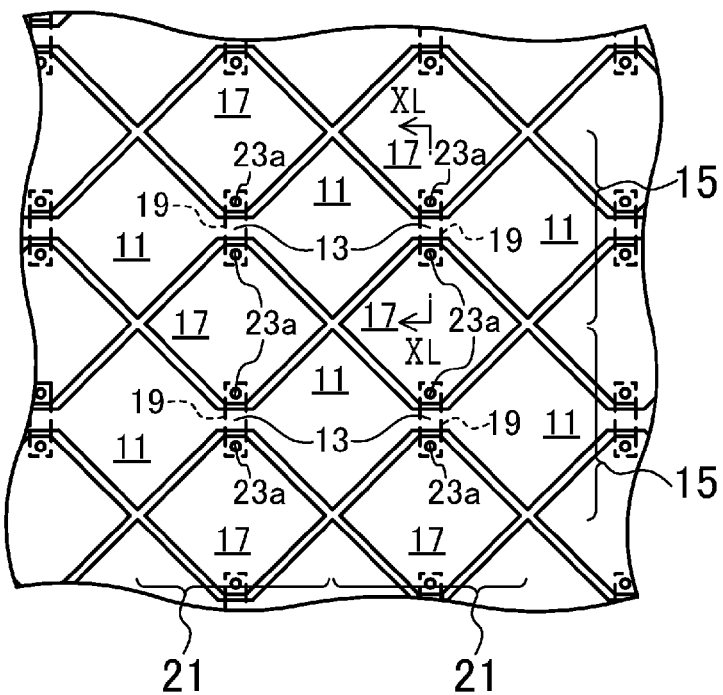
FIG. 39 is an enlarged top view illustrating a touch region of a touch panel according to the other embodiment.
Figure 40:
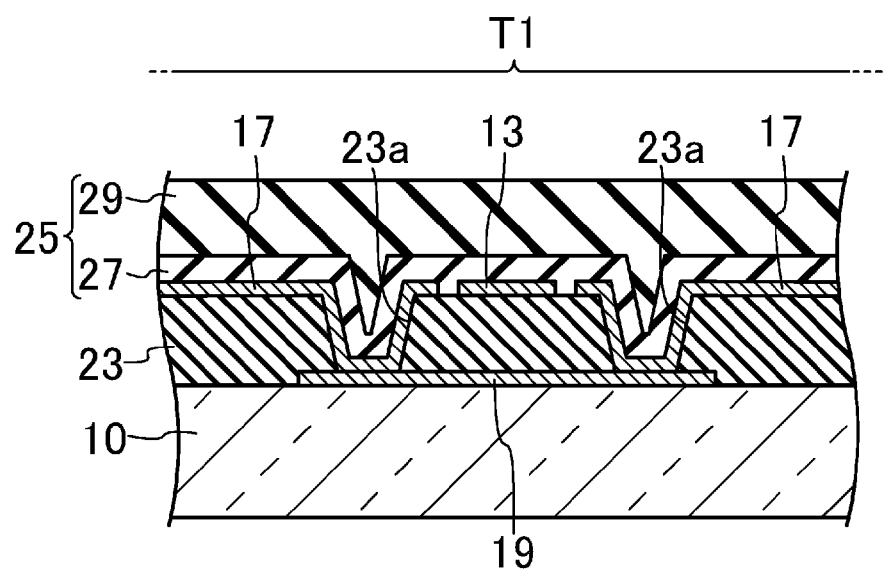
FIG. 40 is a cross-sectional view illustrating the cross-sectional structure taken along the line XL-XL of FIG. 39.

FIG. 39 is an enlarged top view illustrating a touch region T1 of a touch panel TP according to another embodiment. FIG. 40 is a cross-sectional view illustrating the cross-sectional structure taken along the line XL-XL of FIG. 39.

While in the above-described first and second embodiments and the variations, an example has been described where the first electrode groups 15 (i.e., the first electrodes 11), the first connecting portions 13, and the second electrode groups 21 (i.e., the second electrodes 17) are provided under the interlayer insulating film 23, and the second connecting portions 19 are provided on the interlayer insulating film 23, the present disclosure is not limited thereto. For example, as shown in FIGS. 39 and 40, a reversed structure is also applicable, in which second connecting portions 19 are provided under an interlayer insulating film 23, and first electrode groups 15 (i.e., first electrodes 11), first connecting portions 13, and second electrode groups 21 (i.e., second electrodes 17) are provided on the interlayer insulating film 23. In this case, the second connecting portions 19 form the first conductive pattern of the present disclosure, and the first electrode groups 15 (i.e., the first electrodes 11), the first connecting portions 13, and the second electrode groups 21 (i.e., the second electrodes 17) form the second conductive pattern of the present disclosure. In the touch panel TP having the reversed structure, a first internal interconnect layer 34A and a first external interconnect layer 36A are formed of the same film as the second connecting portions 19, and a second internal interconnect layer 34B and a second external interconnect layer 36B are formed of the same film as the first electrode groups 15 (i.e., the first electrodes 11), the first connecting portions 13, and the second electrode groups 21 (i.e., the second electrodes 17).

Similar to the first embodiment, in such a touch panel TP having the reversed structure, the first electrode groups 15 and the second electrode groups 21 are provided in the same layer, thereby enabling highly sensitive detection of a touch position.

Alternatively, first electrode groups 15 (i.e., first electrodes 11) and first connecting portions 13 may be provided under an interlayer insulating film 23, and second electrode groups 21 (i.e., second electrodes 17) and second connecting portions 19 may be provided on the interlayer insulating film 23. In this case, the first electrode groups 15 (i.e., the first electrodes 11) and the first connecting portions 13 form the first conductive pattern of the present disclosure, and the second electrode groups 21 (i.e., the second electrodes 17) and the second connecting portions 19 form the second conductive pattern of the present disclosure. In the touch panel TP with this structure, a first internal interconnect layer 34A and a first external interconnect layer 36A are formed of the same film as the first electrode groups 15 (i.e., the first electrodes 11) and the first connecting portions 13, and a second internal interconnect layer 34B and a second external interconnect layer 36B are formed of the same film as the second electrode groups 21 (i.e., the second electrodes 17) and the second connecting portions 19.

Structure of Internal Connecting Terminal 33

Figure 41:
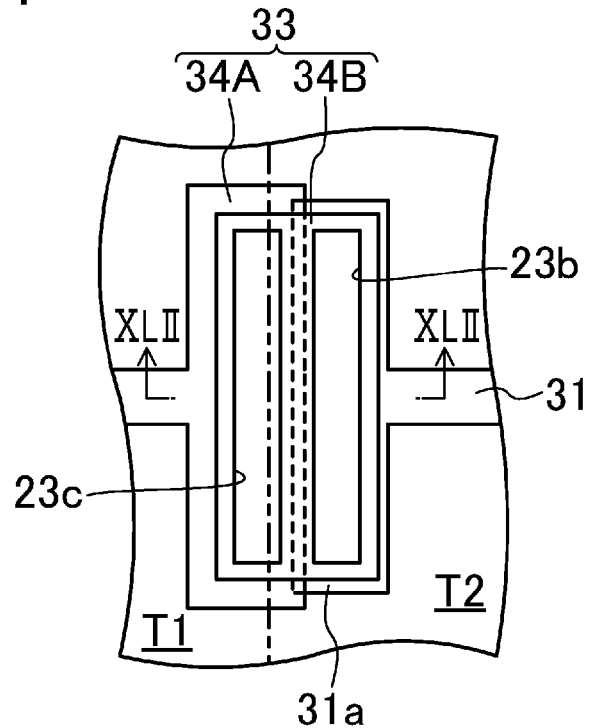
FIG. 41 is a top view illustrating a third aspect of the connection between an internal connecting terminal and a lead line according to the other embodiment.
Figure 42:
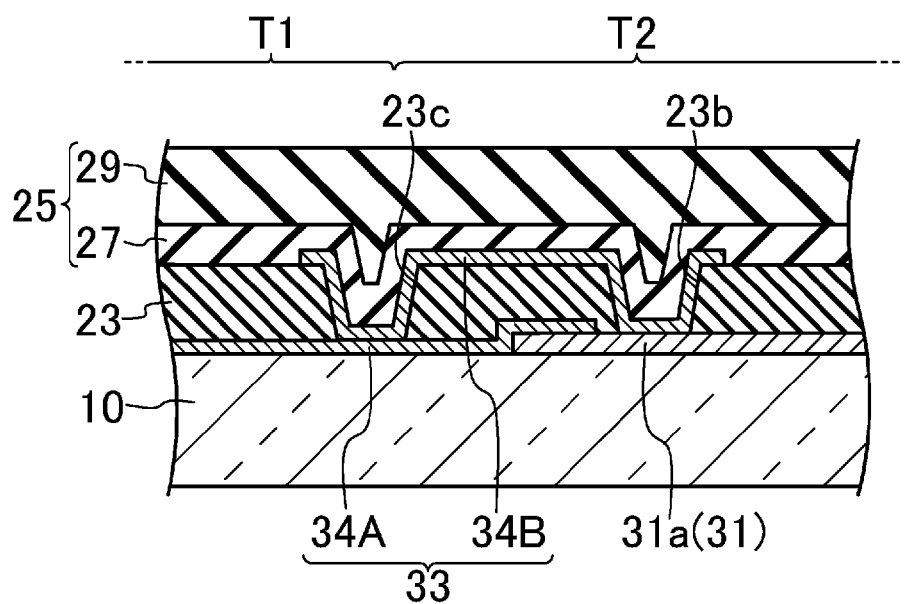
FIG. 42 is a cross-sectional view illustrating the cross-sectional structure taken along the line XLII-XLII of FIG. 41.

FIGS. 41 and 42 illustrate the connection between each internal connecting terminal 33 and a lead line 31 in a touch panel according to another embodiment. FIG. 41 is a top view illustrating a third aspect of the connection between each internal connecting terminal 33 and a lead line 31. FIG. 42 is a cross-sectional view illustrating the cross-sectional structure taken along the line XLII-XLII of FIG. 41.

While in the above-described second embodiment and the variations, each second internal interconnect layer 34B is electrically connected to the corresponding lead line 31 at the portion overlapping the lead base end 31a of the lead line 31 via the first internal interconnect layer 34A, the present disclosure is not limited thereto. As shown in FIGS. 41 and 42, a second internal interconnect layer 34B may be directly connected to the upper surface of the lead line 31 via a contact hole 23b formed in the interlayer insulating film 23 outside the first internal interconnect layer 34A (see the right of FIGS. 41 and 42).

Such a touch panel TP is manufactured by forming the contact hole 23b to partially expose the lead line 31 at the portion overlapping the lead line 31 in the interlayer insulating film 23 outside the first internal interconnect layer 34A in the third patterning step of the second embodiment, and by forming the second internal interconnect layer 34B to be connected to the lead line 31 via the contact hole 23b in the fourth patterning step.

Structure of External Connecting Terminal 35

FIGS. 43-50 illustrate the connection between each external connecting terminal 35 and a lead line 31 in a touch panel TP according to other embodiments.

Figure 43:
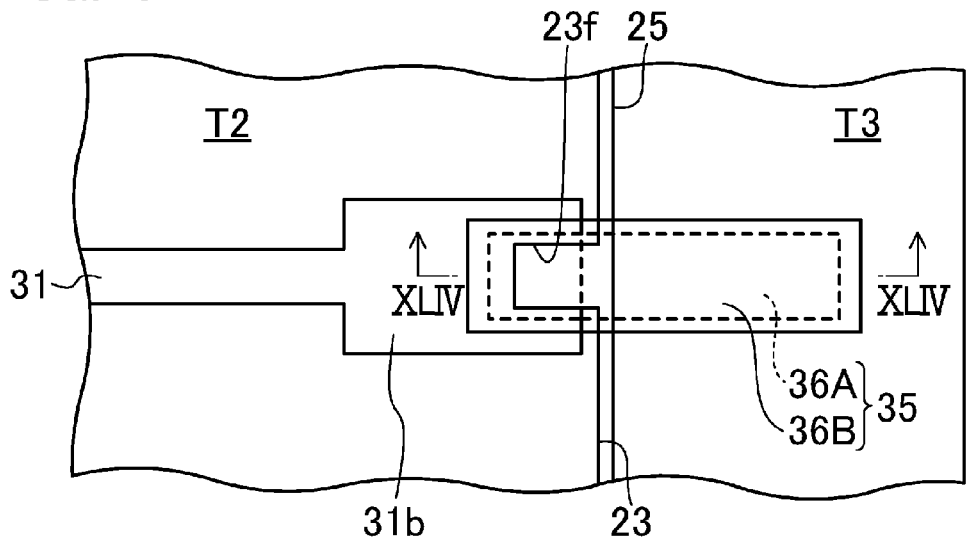
FIG. 43 is a top view illustrating a third aspect of the connection between an external connecting terminal and a lead line according to the other embodiment.
Figure 44:
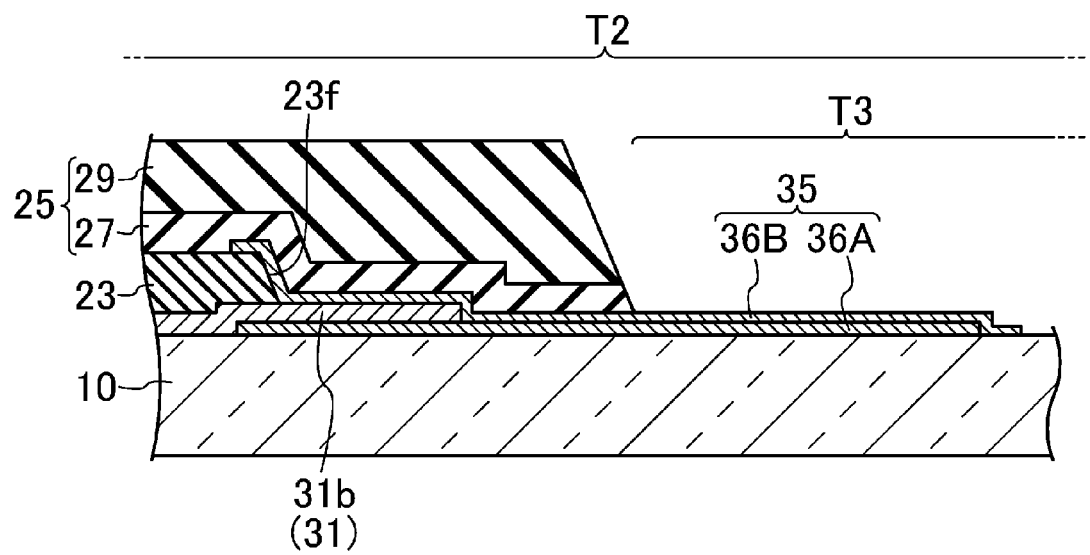
FIG. 44 is a cross-sectional view illustrating the cross-sectional structure taken along the line XLIV-XLIV of FIG. 43.
Figure 45:
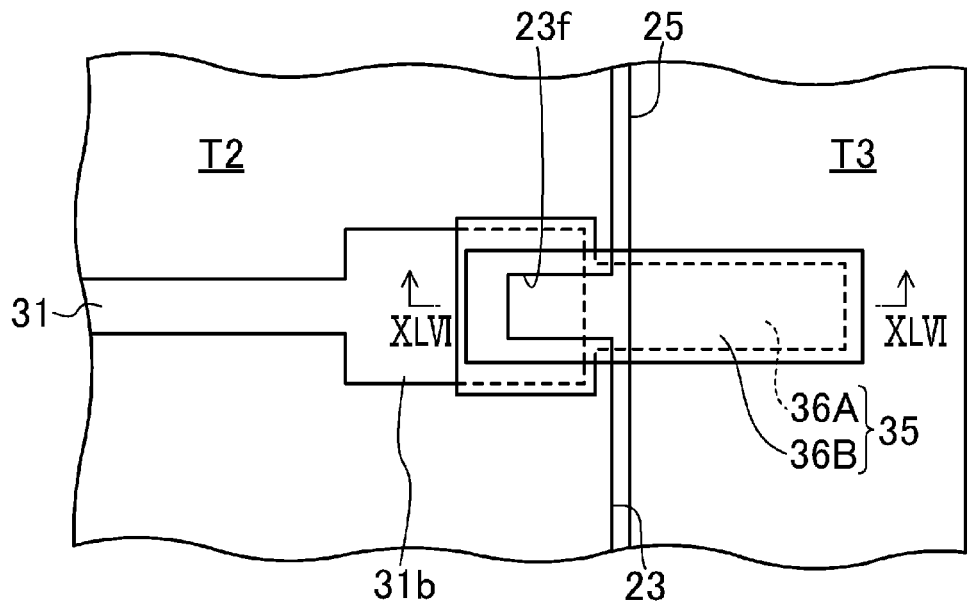
FIG. 45 is a top view illustrating a fourth aspect of the connection between an external connecting terminal and a lead line according to the other embodiment.
Figure 46:
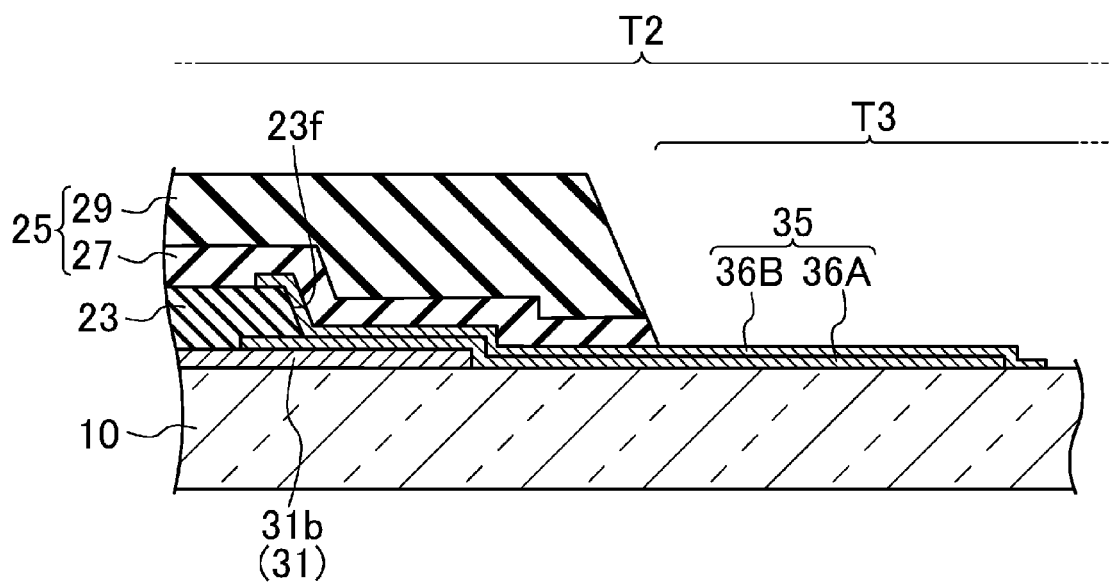
FIG. 46 is a cross-sectional view illustrating the cross-sectional structure taken along the line XLVI-XLVI of FIG. 45.

FIG. 43 is a top view illustrating a third aspect of the connection between each external connecting terminal 35 and a lead line 31. FIG. 44 is a cross-sectional view illustrating the cross-sectional structure taken along the line XLIV-XLIV of FIG. 43. FIG. 45 is a top view illustrating a fourth aspect of the connection between each external connecting terminal 35 and a lead line. FIG. 46 is a cross-sectional view illustrating the cross-sectional structure taken along the line XLVI-XLVI of FIG. 45.

While in the above-described first and second embodiments and the variations, the second external interconnect layer 36B of each external connecting terminal 35 is connected to the corresponding lead line 31 via the contact hole 23d formed in the interlayer insulating film 23, the present disclosure is not limited thereto. For example, as shown in FIGS. 43 and 44, in a touch panel TP having a structure similar to that of the first embodiment, a cutout portion 23f, which is open outside the outer edge of an interlayer insulating film 23, may be formed in the interlayer insulating film 23 instead of the contact hole 23d, and a second external interconnect layer 36B may be connected to a lead line 31 via the cutout portion 23f.

As shown in FIGS. 45 and 46, in a touch panel TP having a structure similar to that of the second embodiment, a cutout portion 23f, which is open outside the outer edge of an interlayer insulating film 23, may be formed in the interlayer insulating film 23 instead of the contact hole 23d, and a second external interconnect layer 36B may be connected to a lead line 31 via the cutout portion 23f.

In these structures, as compared to the first and second embodiments where each second external interconnect layer 36B is connected to the corresponding lead line 31 via the contact hole 23d formed in the interlayer insulating film 23, the contact area between the second external interconnect layer 36B and the lead line 31 increases, since the cutout portion 23f is open outside the outer edge of the interlayer insulating film 23. This reduces the contact resistance between the second external interconnect layer 36B and the lead line 31. As a result, poor conduction between the external connecting terminal 35 and the lead line 31 is greatly prevented.

Figure 47:
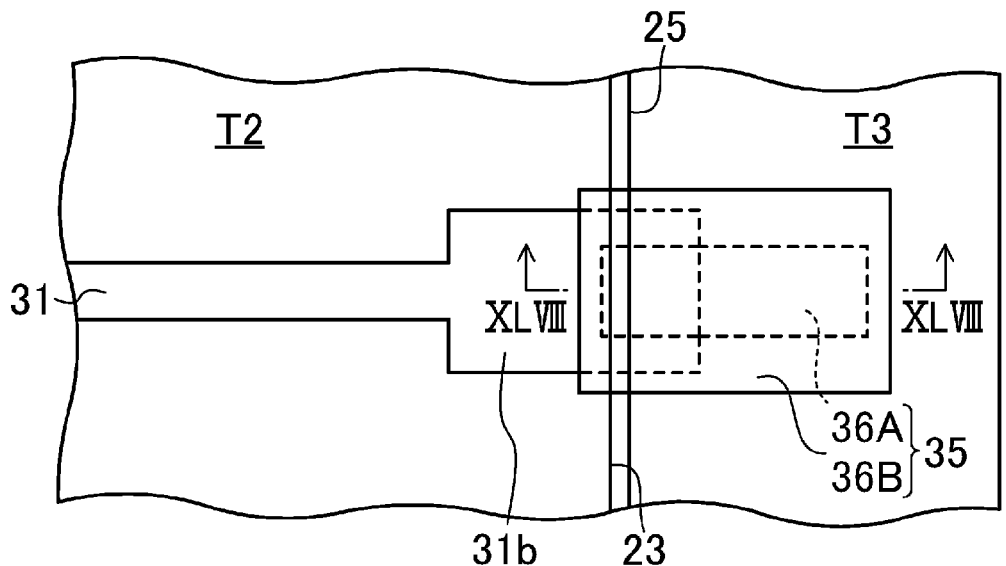
FIG. 47 is a top view illustrating a fifth aspect of the connection between an external connecting terminal and a lead line according to the other embodiment.
Figure 48:
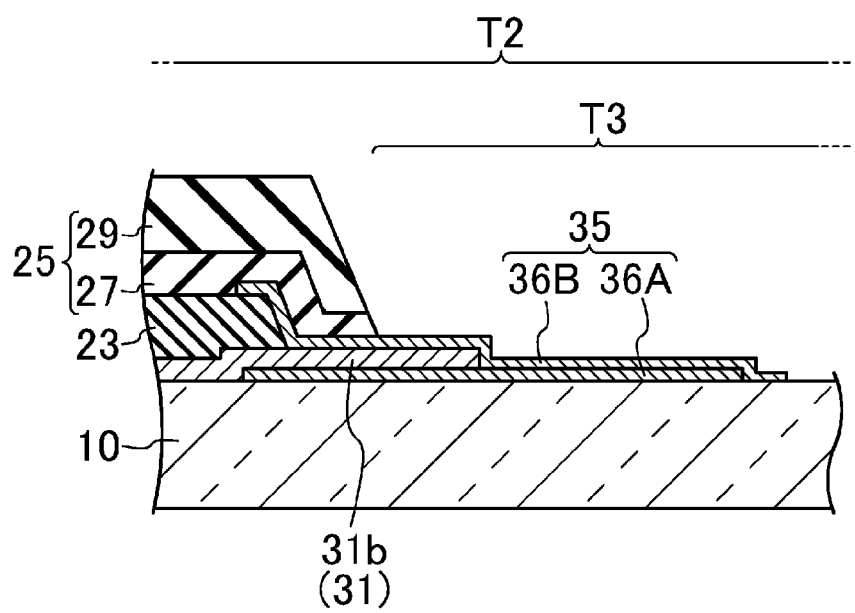
FIG. 48 is a cross-sectional view illustrating the cross-sectional structure taken along the line XLVIII-XLVIII of FIG. 47.
Figure 49:
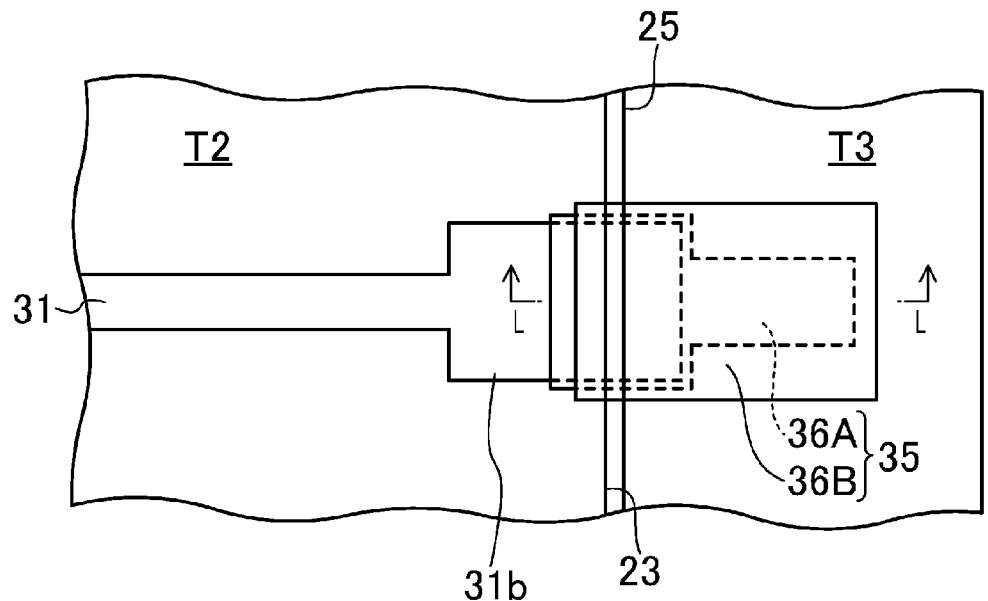
FIG. 49 is a top view illustrating a sixth aspect of the connection between an external connecting terminal and a lead line according to the other embodiment.
Figure 50:
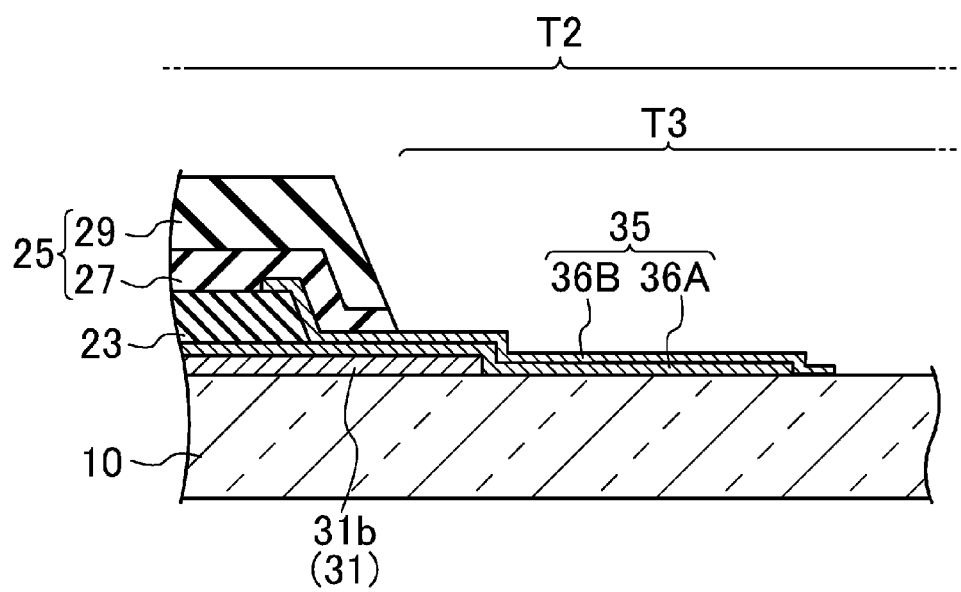
FIG. 50 is a cross-sectional view illustrating the cross-sectional structure taken along the line L-L of FIG. 49.

FIG. 47 is a top view illustrating a fifth aspect of the connection between each external connecting terminal 35 and a lead line 31. FIG. 48 is a cross-sectional view illustrating the cross-sectional structure taken along the line XLVIII-XLVIII of FIG. 46. FIG. 49 is a top view illustrating a fifth aspect of the connection between each external connecting terminal 35 and a lead line 31. FIG. 50 is a cross-sectional view illustrating the cross-sectional structure taken along the line L-L of FIG. 49.

While in the above-described first and second embodiments and the variations, each entire lead line 31 is located inside the interlayer insulating film 23, the present disclosure is not limited thereto. For example, as shown in FIGS. 47 and 48, in a touch panel TP having a structure similar to that of the first embodiment, a lead top 31b of a lead line 31 may partially extend outside an interlayer insulating film 23 and a protection insulating film 25. In this case, a second external interconnect layer 36B preferably covers the entire extending portion of the lead line 31.

As shown in FIGS. 49 and 50, in a touch panel TP having a structure similar to that of the second embodiment, a lead top 31b of the lead line 31 may partially extend outside an interlayer insulating film 23 and a protection insulating film 25. In this case as well, a first external interconnect layer 36A and a second external interconnect layer 36B preferably cover the entire extending portion of the lead line 31.

In these structures, although being located outside the interlayer insulating film 23 and the protection insulating film, the extending portion of the lead line 31 is protected from moisture etc., by at least one of the first external interconnect layer 36A or the second external interconnect layer 36B covering the extending portion, and is less corroded. In these structures, in which the lead top 31b of the lead line 31 at least partially extends outside the insulating films 23 and 25, the width of a picture-frame region T2 at a terminal region T3 can be reduced as compared to the structure in which the entire lead line 31 is inside the insulating films 23 and 25.

While in the above-described first and second embodiments and the variations, each second external interconnect layer 36B is electrically connected to the corresponding lead line 31 at the portion overlapping the first external interconnect layer 36A, the present disclosure is not limited thereto. The first external interconnect layer 36A and the second external interconnect layer 36B may be electrically connected to the lead line 31 at different portions.

While in the above-described first and second embodiments and the variations, each external connecting terminal 35 has the parallel connection structure of the first external interconnect layer 36A and the second external interconnect layer 36B, which are connected in parallel to the lead line 31, the present disclosure is not limited thereto. As long as each internal connecting terminal 33 has the parallel connection structure of the first internal interconnect layer 34A and the second internal interconnect layer 34B, which are connected in parallel to the lead line 31, the external connecting terminal 35 may not have the parallel connection structure. That is, each external connecting terminal 35 may be a single layer connected in series to the lead line 31 and made of transparent conductive oxide such as ITO and IZO, and may overlap and be connected to a lead base end 31a of the lead line 31 to form a simple connection.

Structure of Touch Panel TP in Liquid Crystal Display Device S

While in the above-described first and second embodiments and the variations, an example has been described where the touch panel TP is directly formed on the outer surface of the counter substrate 3, the present disclosure is not limited thereto. A touch panel TP may be formed on a transparent substrate such as a glass substrate different from the counter substrate 3, and the touch panel TP may be bonded to the counter substrate 3, thereby forming a liquid crystal display device S.

Method of Manufacturing Liquid Crystal Display Device S

In the above-described first embodiment, in the bonding step St4, the liquid crystal display panel DP is fabricated by what is called "one drop filling," in which the TFT substrate 1 is bonded to the counter substrate 3 via the sealing material 5 and the liquid crystal material, after dispensing in a frame-like form, the sealing material 5 on the TFT substrate 1 or the counter substrate 3, and dropping the liquid crystal material inside the sealing material 5. Instead, the liquid crystal display panel DP may be fabricated by what is called "vacuum injection," in which a sealing material is applied to the TFT substrate 1 or the counter substrate 3 in a substantially frame-like form with a cutout portion, and the TFT substrate 1 is boded to the counter substrate 3 via the sealing material to form a bond including void cells; a liquid crystal material is injected to the void cells of the bond from an inlet, which is the cutout portion of the sealing material, by utilizing a pressure difference caused by vacuuming; and then the inlet is sealed by a sealing material.

While in the above-described first embodiment, the touch panel formation step St1 is performed before the counter substrate formation step St2, the present disclosure is not limited thereto. The touch panel formation step St1 may be performed after the bonding step St4. That is, a touch panel TP may be manufactured by forming by repeated known photolithography, the first electrodes 11, the first connecting portions 13, the second electrodes 17, the internal connecting terminals 33, the lead lines 31, the interlayer insulating film 23, the second connecting portions 19, the internal connecting terminals 33 (each including the first internal interconnect layer 34A and the second internal interconnect layer 34B), the external connecting terminals 35 (each including the first external interconnect layer 36A and the second external interconnect layer 36B), and the protection insulating film 25 on the surface of a bond formed by bonding the TFT substrate 1 to the counter substrate 3.

While the preferable embodiments and variation of the present disclosure have been described above, the technical scope of the present disclosure is not limited to the scope of the embodiments and variations. The embodiments and variations are mere examples, and those skilled in the art will recognize that combinations of the elements and processing processes may be variously modified and such modifications fall within the scope of the present disclosure.

For example, while the liquid crystal display device has been described as an example in the above-described first and second embodiments and the variations, the present disclosure is not limited thereto. The present disclosure is applicable not only to a liquid crystal display device, but to various display devices such as an organic electro luminescence (EL) display device, an inorganic EL display device, a plasma display device, a field emission display (FED), and a surface-conduction electron-emitter display (SED), and is widely applicable as long as the display device includes a touch panel TP.

INDUSTRIAL APPLICABILITY

As described above, the present disclosure is useful for a touch panel, a display device including the touch panel, and a method of manufacturing the touch panel; and is particularly suited for a touch panel, a display device including the touch panel, and a method of manufacturing the touch panel, which require an excellent function of touch position detection, while reducing the electrical resistance of internal connecting terminals without increasing the manufacturing costs.

DESCRIPTION OF REFERENCE CHARACTERS

S Liquid Crystal Display Device
DP Liquid Crystal Display Panel
TP Touch Panel
T1 Touch Region
T3 Terminal Region
11 First Electrode (First Conductive Pattern)
13 First Connecting Portion (First Conductive Pattern)
15 First Electrode Group (First Conductive Pattern)
17 Second Electrode (First Conductive Pattern)
19 Second Connecting Portion (Second Conductive Pattern)
21 Second Electrode Group (First Conductive Pattern)
23 Interlayer Insulating Film
23b, 23c Contact Hole
23e Opening
25 Protection Insulating Film
31 Lead Line
31a Lead Base End
33 Internal Connecting Terminal
34A First Internal Interconnect Layer (First Interconnect Layer)
34B Second Internal Interconnect Layer (Second Interconnect Layer)
41 Controller (External Circuit)
51, 55 Transparent Conductive Film
53 Metal Multilayer Film (Metal Film)
54 Insulating Film
59 Multilayer Insulating Film (Insulating Film)

The invention claimed is:

1. A touch panel comprising:
 a touch region configured to detect a touch position touched by a contact body;
 a terminal region provided outside the touch region and connected to an external circuit;
 a first conductive pattern configured to provide touch position detection located in the touch region and made of transparent conductive oxide;
 an interlayer insulating film provided to cover at least a portion of the first conductive pattern;
 a second conductive pattern configured to provide touch position detection provided on the interlayer insulating film and made of transparent conductive oxide;
 a protection insulating film provided to cover the second conductive pattern;
 a lead line drawn from the touch region to the terminal region, and covered by the insulating film; and
 an internal connecting terminal connected to at least one of the first conductive pattern or the second conductive pattern, and connected to a lead base end of the lead line, wherein
 the internal connecting terminal includes a first interconnect layer formed of a same film as the first conductive pattern, and a second interconnect layer formed of a same film as the second conductive pattern, the first and the second interconnect layers being electrically connected to the lead line at a portion of the touch panel overlapping the lead line and being electrically connected together at a portion outside the lead line.

2. The touch panel of claim 1, wherein
contact holes are formed in the interlayer insulating film at a portion overlapping the lead base end of the lead line, and a portion outside the lead line, and
the second interconnect layer is electrically connected to the lead line at the portion overlapping the lead line and is electrically connected to the first interconnect layer at the portion outside the lead line via the contact holes.

3. The touch panel of claim 1, wherein
an opening, which is open from a portion overlapping the lead base end of the lead line to a portion outside the lead line, is formed in the interlayer insulating film, and the second interconnect layer is electrically connected to the lead line at the portion overlapping the lead line inside the opening, and is electrically connected to the first interconnect layer at the portion outside the lead line.

4. The touch panel of claim 1, wherein
the lead line is formed by stacking a first interconnect layer formed of a same film as the first conductive pattern, and a second interconnect layer made of a metal material.

5. The touch panel of claim 1, wherein
one of the first conductive pattern or the second conductive pattern includes
a plurality of first electrode groups arranged in parallel, each including a plurality of first electrodes aligned in one direction,
a plurality of second electrode groups arranged in parallel, each including a plurality of second electrodes aligned in a direction intersecting the first electrode groups, and
a first connecting portion connecting each adjacent pair of the first electrodes of the first electrode groups, and
the other one of the first conductive pattern or the second conductive pattern includes a second connecting portion connecting each adjacent pair of the second electrodes of the second electrode groups.

6. The touch panel of claim 1, wherein
the transparent conductive oxide forming the first conductive pattern and the second conductive pattern is indium tin oxide or indium zinc oxide.

7. A display device comprising the touch panel of claim 1.

8. The display device of claim 7, wherein the touch panel is directly formed on a substrate surface forming a display panel.

9. A method of manufacturing the touch panel of claim 1, the method comprising:
   a first patterning step of forming the first conductive pattern and the first interconnect layer by forming a transparent conductive film made of transparent conductive oxide on a base substrate, and patterning the transparent conductive film using a first photomask;
   a second patterning step of forming the lead line to be connected to the first interconnect layer by forming a metal film to cover the first conductive pattern and the first interconnect layer, and patterning the metal film using a second photomask;
   a third patterning step of forming the interlayer insulating film to expose at least part of the first interconnect layer and the lead line by forming an insulating film to cover the first conductive pattern, the first interconnect layer, and the lead line, and patterning the insulating film using a third photomask;
   a fourth patterning step of forming the second conductive pattern, and forming the second interconnect layer to be connected to the first interconnect layer and the lead line by forming a transparent conductive film made of transparent conductive oxide on the interlayer insulating film, and patterning the transparent conductive film using a fourth photomask; and
   a fifth patterning step of forming the protection insulating film by forming an insulating film to cover the second conductive pattern and the second interconnect layer, and patterning the insulating film using a fifth photomask.

10. A method of manufacturing the touch panel of claim 1, the method comprising:
   a first patterning step of forming the lead line by forming a metal film on a base substrate, and pattering the metal film using a first photomask;
   a second patterning step of forming the first conductive pattern, and forming the first interconnect layer to partially overlap and to be connected to the lead line by forming a transparent conductive film made of transparent conductive oxide to cover the lead line, and patterning the transparent conductive film using a second photomask;
   a third patterning step of forming the interlayer insulating film to expose at least part of the lead line or the first interconnect layer at a portion overlapping the lead line, and part of the first interconnect layer at a portion outside the lead line by forming an insulating film to cover the lead line, the first conductive pattern, and the first interconnect layer, and patterning the insulating film using a third photomask;
   a fourth patterning step of forming the second conductive pattern, and forming the second interconnect layer to be connected to the lead line or the first interconnect layer at a portion overlapping the lead line, and to the first interconnect layer at a portion outside the lead line by forming a transparent conductive film made of transparent conductive oxide on the interlayer insulating film, and patterning the transparent conductive film using a fourth photomask; and
   a fifth patterning step of forming the protection insulating film by forming an insulating film to cover the second conductive pattern and the second interconnect layer, and patterning the insulating film using a fifth photomask.

\* \* \* \* \*